(12) United States Patent
Zanni et al.

(10) Patent No.: US 7,760,342 B2
(45) Date of Patent: Jul. 20, 2010

(54) MULTIDIMENSIONAL SPECTROMETER

(75) Inventors: Martin Thomas Zanni, Madison, WI (US); Niels H. Damrauer, Boulder, CO (US)

(73) Assignees: Wisconsin Alumni Research Foundation, Madison, WI (US); The Regents of the University of Colorado, Denver, CO (US)

( * ) Notice: Subject to any disclaimer, the term of this patent is extended or adjusted under 35 U.S.C. 154(b) by 282 days.

(21) Appl. No.: 11/963,123

(22) Filed: Dec. 21, 2007

(65) Prior Publication Data

US 2009/0161092 A1    Jun. 25, 2009

(51) Int. Cl.
*G01J 3/00* (2006.01)
(52) U.S. Cl. ..................................... 356/51
(58) Field of Classification Search ............... 356/51, 356/300–352
See application file for complete search history.

(56) References Cited

U.S. PATENT DOCUMENTS

| | | | |
|---|---|---|---|
| 4,759,613 A | 7/1988 | Fox | |
| 5,526,171 A | 6/1996 | Warren | |
| 5,600,444 A | 2/1997 | Tong | |
| 5,891,643 A | 4/1999 | Fesik et al. | |
| 5,989,827 A | 11/1999 | Fesik et al. | |
| 6,141,094 A | 10/2000 | Tong | |
| 6,621,613 B2 | 9/2003 | Silberberg et al. | |
| 6,677,160 B1 | 1/2004 | Stockman et al. | |
| 6,764,858 B2 | 7/2004 | Stockman | |
| 7,064,844 B2 | 6/2006 | Budach et al. | |
| 2003/0099264 A1 | 5/2003 | Dantus et al. | |
| 2003/0143757 A1 | 7/2003 | Moore et al. | |
| 2003/0148391 A1 | 8/2003 | Salafsky | |
| 2006/0017999 A1 | 1/2006 | Vaughan et al. | |
| 2006/0063188 A1 | 3/2006 | Zanni et al. | |
| 2006/0187974 A1 | 8/2006 | Dantus | |
| 2006/0256332 A1 | 11/2006 | Sandstrom | |
| 2007/0152154 A1 | 7/2007 | DeCamp et al. | |
| 2007/0171513 A1 | 7/2007 | Pannell et al. | |
| 2007/0291264 A1 | 12/2007 | Silberberg et al. | |

FOREIGN PATENT DOCUMENTS

| | | |
|---|---|---|
| WO | WO 97/18471 | 5/1997 |
| WO | WO 98/57155 | 12/1998 |
| WO | WO 02/27309 | 4/2002 |
| WO | WO 02/44730 | 6/2002 |

(Continued)

OTHER PUBLICATIONS

Asplund, M.C. et al., "Two-dimensional infrared spectroscopy of peptides by phase-controlled femtosecond vibrational photon echoes," Proc. Natl. Acad. Sci. USA (2000) 97(15):8219-8224.

(Continued)

*Primary Examiner*—Michael P Stafira
(74) *Attorney, Agent, or Firm*—Michael Best & Friedrich LLP

(57) ABSTRACT

A multidimensional spectrometer for the infrared, visible, and ultraviolet regions of the electromagnetic spectrum, and a method for making multidimensional spectroscopic measurements in the infrared, visible, and ultraviolet regions of the electromagnetic spectrum. The multidimensional spectrometer facilitates measurements of inter- and intra-molecular interactions.

42 Claims, 11 Drawing Sheets

FOREIGN PATENT DOCUMENTS

| | | |
|---|---|---|
| WO | WO 03/002724 | 1/2003 |
| WO | WO 2004/031749 | 4/2004 |
| WO | WO 2006/033962 | 3/2006 |

OTHER PUBLICATIONS

Belikov, R. et al., "Femtosecond direct space-to-time pulse shaping with MEMS micromirror arrays," Proceedings of IEEE/LEOS International Conference on Optical MEMS (Aug. 2003) 24-25.

Ding, F. et al., "Passively correcting phase drift in two-dimensional infrared spectroscopy," Optics Letters (2006) 31(19):2918-2920.

Ding, F. et al., "Heterodyned 3D IR spectroscopy," Chem. Phys. (2007) 341(1-3):95-105.

Gallagher Faeder, S.M. et al., "Two-dimensional electronic correlation and relaxation spectra: theory and model calculations," J. Phys. Chem. A. (1999) 103:10489-10505.

Grumstrup, E.M. et al., "Facile collection of two-dimensional electronic spectra using femtosecond pulse-shaping technology," Optics Express (2007) 15(25):16681-16689.

Hochstrasser, R.M. et al., "Two-dimensional spectroscopy at infrared and optical frequencies," Proc. Natl. Acad. Sci. USA (2007) 104(36):14190-14196.

Kaindl, R.A. et al., "Generation, shaping and characterization of intense femtosecond pulses tunable from 3 to 20 μm," J. Opt. Soc. Am. B. (2000) 17(12):2086-2094.

Keusters, et al., "Role of pulse phase and direction in two-dimensional optical spectroscopy," J. Phys. Chem. A (1999) 103:10369-10380.

Lacolle, M. et al., "Algorithms for the synthesis of complex-value spectral filters with an array of micromechanical mirrors," Optics Express (2006) 14(26):12590-12612.

Montgomery, M.A. et al., "General method for the dimension reduction of adaptive control experiments," J. Phys. Chem. A. (2006) 110:6391-6394.

Rabitz, H. et al., "Whither the future of controlling quantum phenomena?" Science (2000) 288:824-828.

Roth, M. et al., "Acousto-optical shaping of ultraviolet femtosecond pulses," Appl. Phys. B. (2005) 80:441-444.

Shim, S-H. et al., "Automated 2D IR Spectroscoppy using a mid-IR pulse shaper and application of this technology to the human islet amyloid polypeptide," Proc. Natl. Acad. Sci. (2007) 104(36):14197-14202.

Shim, S-H. et al., "Femtosecond pulse shaping directly in the mid-IR using acousto-optic modulation," Optics Letters (2006) 31(6):838-840.

Shim, S-H. et al., "Generation and characterization of phase and amplitude shaped femtosecond mid-IR pulses," Optics Express (2006) 14(26):13120-13130.

Strasfeld, D.B. et al., "Controlling vibrational excitation with shaped mid-IR pulses," Phys. Rev. Lett. (2007) 99:038102-1-38102-4.

Tan, H-S. et al., "Mid infrared pulse shaping by optical parametric amplification and its application to optical free induction decay measurement," Optics Express (2003) 11(9):1021-1028.

Vaughan et al., "Coherently controlled ultrafast four-wave mixing spectroscopy," J. Physical Chem. A. (2007) 111(23):4873-4883.

Wagner, W. et al., "Rapid phase-cycled two-dimensional optical spectroscopy in fluorescence and transmission mode," Optics Express (2005) 13(10):3697-3706.

Weiner, A.M., "Femtosecond pulse shaping using spatial light modulators," Rev. Sci. Instruments (2000) 71(5):1929-1960.

Zanni, M.T. et al., "Two-dimensional IR spectroscopy can be designed to eliminate the diagonal peaks and expose only the crosspeaks needed for structure determination," Proc. Nat. Acad. Sci. USA (2001) 98(20):11265-11270.

Abramavicius, D. et al., "Disentangling multidimensional femtosecond spectra of excitons by pulse shaping with coherent control," J. Chem. Phys. (2004) 120(18):8373-8378.

Asbury, J.B. et al., "Ultrafast heterodyne detected infrared multidimensional vibrational stimulated echo studies of hydrogen bond dynamids," Chem. Phys. Lett. (2003) 374:362-371.

Besemann, D. et al., "Experimental determinations of coherent multidimensional vibrational spectroscopy," Bull. Korean Chem. Soc. (2003) 24(8):1119-1125.

Blount, K.F. et al., "The hammerhead ribozyme," Biochem. Soc. Trans. (2002) 30:1119-1122.

Bredenbeck, J. et al., "Transient 2D-IR spectroscopy: snapshots of the nonequilibrium ensemble during the picosecond conformational transition of a small peptide," J. Phys. Chem. B (2003) 107:8654-8660.

Chernyak, V. et al., "Multidimensional femtosecond spectroscopies of molecular aggregates and semiconductor nanostructures: the nonlinear exciton equations," J. Chem. Phys. (1998) 109(21):9587-9601.

Cho, M., "Nonlinear response functions for the three-dimensional spectroscopies," J. chem. Phys. (2001) 115(10):4424-4437.

Cho, M., "Two-dimensional circularly polarized pump-probe spectroscopy," J. Chem. Phys. (2003) 119(14):7003-7016.

Cho, M., "Ultrafast vibrational spectroscopy in condensed phases," Phys. Chem. Commun. (2002) 5(7):40-58.

Choi, J-H. et al., "Inter-peptide interaction and delocalization of amide I vibrational excitons in myoglobin and flavodoxin," J. Chem. Phys. (2002) 117(14):6821-6832.

Cohen, R.J. et al., "Rate of unwinding small DNA," J. Mol. Biol. (1971) 61:525-542.

Demirdoven, N. et al., "Correlated vibrational dynamics revealed by two-dimensional infrared spectroscopy," Phys. Rev. Lett. (2002) 89(23):237401/1-237401/4.

Fecko, C.J. et al., "Ultrafast hydrogen-bond dynamics in the infrared spectroscopy of water," Science (2003) 301:1698-1702.

Fulmer, E.C. et al., "A pulse sequence for directly measuring the anharmonicities of coupled vibrations: two-quantum two-dimensional infrared spectroscopy," J. Chem. Phys. (2004) 120(17):8067-8078.

Ge, N-H. et al., "Local structure and dynamics of liquid acetone by heterodyned 2D IR spectroscopy," in Ultrafast Phenomena XIII, Murane et al. eds., Springer-Verlag (2002) 255-256.

Gnanakaran, S. et al., "Conformational preferences and vibrational frequency distributions of short peptides in relation to multidimensional infrared spectroscopy," J. Am. Chem. Sco. (2001) 123:12886-12898.

Gnanakaran, S. et al., "Nature of structural inhomogeneities on folding a helix and their influence on spectral measurements," Proc. Natl. Acad. Sci. USA (2004) 101(25):9229-9234.

Golonzka, O. et al., "Vibrational anharmonicities revealed by coherent two-dimensional infrared spectroscopy," Phys. Rev. Lett. (2001) 86(10):2154-2157.

Ham, S. et al., "Amide I modes in the N-methylacetamide dimer and glycine dipeptide analog: diagonal force constants," J. Chem. Phys. (2003) 118(15):6915-6922.

Ham, S. et al., "Amide I modes of alpha-helical polypeptide in liquid water: conformational fluctuation, phase correlation, and linear nonlinear vibrational spectra," J. Phys. Chem. B (2004) 108:9333-9345.

Ham, S. et al., "Correlation between electronic and molecular structure distortions and vibrational properties. II. Amide I modes of NMA-nD2O complexes," J. Chem. Phys. (2003) 118(8):3491-3498.

Hamm, P. et al., "Coupling of the amide I modes of the glycine dipeptide," Bull. Chem. Soc. Jpn. (2002) 75:985-988.

Hamm, P. et al., "Pump/probe self heterodyned 2D spectroscopy of vibrational transitions of small globular peptide," J. Chem. Phys. (2000) 112(4):1907-1916.

Hamm, P. et al., "Structure of the amide I band of peptides measured by femtosecond nonlinear-infrared spectroscopy," J. Phys. Chem. B (1998) 102(31):6123-6138.

Hamm, P. et al., "The two-dimensional IR nonlinear spectroscopy of a cyclic penta-peptide in relation to its three-dimensional structure," Proc. Natl. Acad. Sci. USA (1999) 96:2036-2041.

Khalil, M. et al., "Obtaining absorptive line shapes in two-dimensional infrared vibrational correlation spectra," Phys. Rev. Lett. (2003) 90(4):047401:1-4.

Khalil, M. et al., "Vibrational coherence transfer characterized with fourier-transform 2D IR spectroscopy," J. Phys. Chem. (2004) 121(1):362-373.

Krimm, S. et al., "Vibrational spectroscopy and conformation of peptides, polypeptides and proteins," Adv. Prot. Chem. (1986) 38:181-364.

Krummel, A.T. et al., "Inter- and intra-strand vibrational coupling in DNA studied with heterodyned 2D IR spectroscopy," J. Phys. Chem. B (2003) 107:9165-9169.

Le Bihan, T. et al., "Determination of the secondary structure and conformation of puroindolines by infrared and raman spectroscopy," Biochem. (1996) 35:12712-12722.

Merchant, K.A. et al., "Frequency selected ultrafast infrared vibrational echo studies of liquids, glasses, and proteins," J. Phys. Chem. A (2002) 106:8839-8849.

Moran, A.M. et al., "Linear and nonlinear infrared structures of local alpha-and $3_{10}$-helical structures in alanine polypeptides," J. Chem. Phys. (2003) 118(8):3651-3659.

Moran, A. et al., "The origin of vibrational mode couplings in various secondary structural motifs of polypeptides," Proc. Natl. Acad. Sci. USA (2004) 101:506-510.

Mukherjee, P. et al., "Site-specific vibrational dynamics of the CD3zeta membrane peptide using heterodyned two-dimensional infrared photon echo spectroscopy," J. Chem. Phys. (2004) 120(21):10215-10224.

Paul, C. et al., "Vibrational coupling, isotopic editing, and beta-sheet structure in a membrane-bound polypeptide," J. Am. Chem. Soc. (2004) 126:5843-5850.

Piryantinski, A. et al., "Vibrational-exciton relaxation probed by three-pulse echoes in polypeptides," Chem. Phys. (2001) 266:285-294.

Rubtsov, I.V. et al., "Dual-frequency 2D-IR spectroscopy heterodyned photon echo of the peptide bond," Proc. Natl. Acad. Sci. USA (2003) 100(10):5601-5606.

Scheurer, C. et al., "Design strategies for pulse sequences in multidimensional optical spectroscopies," J. Chem. Phys. (2001) 115(11):4989-5004.

Scheurer, C. et al., "Infrared analogs of heteronuclear nuclear magnetic resonance coherence transfer experiments in peptides," J. Chem. Phys. (2002) 116(15):6803-6816.

Scheurer, C. et al., "Signatures of beta-peptide unfolding in two-dimensional vibrational echo spectroscopy: a simulation study," J. Am. Chem. Soc. (2001) 123(13):3114-3124.

Tian, P. et al., "Femtosecond phase-coherent two-dimensional spectroscopy," Science (2003) 300:1553-1555.

Venkatramani, R. et al., "Correlated line broadening in multidimensional vibrational spectroscopy," J. Chem. Phys. (2002) 117(24):11089-11101.

Wang, J. et al., "Characteristics of the two-dimensional infrared spectroscopy of helices from approximate simulations and analytic models," Chem. Phys. (2004) 297:195-219.

Woutersen, S. et al., "Structure determination of trialanine in water using polarization sensitive two-dimensional vibrational spectroscopy," J. Phys. Chem. B (2000) 104:11316-11320.

Yeremenko, S. et al., "Hydrogen-bond dynamics in water explored by heterodyne-detected photo echo," Chem. Phys. Lett (2003) 369:107-113.

Yuen, H.P. et al., "Noise in homodyne and heterodyne detection," Opt. Lett. (1983) 8(3):177-179.

Zanni, M.T. et al., "Frequency resolved and heterodyned femtosecond infrared echos of peptides; multiple pulse coherent vibrational analogues of NMR," In: Ultrafast Phenomena XII, Elsaesser et al., eds., Springer-Verlag, Berlin (2000) 504-506.

Zanni, M.T. et al., "Heterodyned two-dimensional infrared spectroscopy of solvent-dependent conformations of acetylproline-NH2," J. Phys. Chem. B (2001) 105:6520-6535.

Zhao, W. et al., "Doubly vibrationally enhanced four wave mixing: the optical analog to 2D NMR," Phys. Rev. Lett. (2000) 84(7):1411-1414.

International Search Report and Written Opinion of the International Searching Authority for PCT/US05/32960 dated Jun. 19, 2008 (11 pages).

United States Office Action for U.S. Appl. No. 11/228,042 dated Jan. 23, 2009 (9 pages).

United States Office Action for U.S. Appl. No. 11/228,042 dated Jun. 6, 2008 (11 pages).

Zanni, M.T., "New advances and applications of 2D IR spectroscopies: membrane peptides and coherent control," University of Pennsylvania Presentation given on Feb. 1, 2007, 93 pages.

Zanni, M.T., "New technology driving new science: mid-IR pulse shaping and automated 2D IR spectroscopy," ACS Presentation given on Mar. 24, 2007, 25 pages.

International Search Report and Written Opinion for Application No. PCT/US08/78582 dated May 27, 2009 (10 pages).

Meystre, P. and Sargent, M., Elements of Quantum Optics, 2nd Edition, Springer-Verlag (1991) Chapter 11, p. 303-311.

United States Patent Office Action for U.S. Appl. No. 11/228,042 dated Oct. 6, 2009 (11 pages).

Zanni, M. et al., "Vibrational tags for measuring distances and angles in biomolecules using 2D IR spectroscopy," Biophys. J. (2004) 86(1):322A.

Zhao, W. et al., "Nonlinear two-dimensional vibrational spectroscopy," Applied Spectroscopy (2000) 54(7):1000-1004.

European Patent Office Search Report for Application No. 05812230 dated Mar. 17, 2010 (6 pages).

MULTIDIMENSIONAL SPECTROMETER

STATEMENT REGARDING FEDERALLY FUNDED RESEARCH

This invention was made with U.S. Government support under Grant No. 0350518 awarded by the National Science Foundation, under Grant No. AI064797 awarded by the National Institutes of Health, and by Grant No. DE-FG02-07ER15890 awarded by the Department of Energy. The United States Government has certain rights in this invention.

BACKGROUND OF THE INVENTION

The present invention relates to spectrometers capable of measuring the interaction between atoms and molecules in the same species or interactions between atoms and molecules of different species.

Broadly, spectroscopy relates to the absorption of electromagnetic radiation ("light") by molecular or atomic species. A wide variety of spectrometers are known. These include infrared (IR) spectrometers, which principally measure differences in molecular vibrational states, ultraviolet-visible (UV-VIS) spectrometers, which principally measure differences in molecular electronic states, and nuclear magnetic resonance (NMR) spectrometers, which principally measure differences in molecular nuclear spin states.

Typically, a sample of interest is exposed to a spectrum of light and the resulting light is compared to the spectrum of light absent the sample of interest. By subtracting the detected spectra with and without the sample of interest, an absorption spectrum is created. Such a one-dimensional spectrum typically has frequency as the independent variable and absorption as the dependent variable. The absorption peaks in the spectrum are indicative of vibrational/electronic/nuclear spin energy states in the species of interest.

There are thousands of known applications for spectroscopy. One application of spectroscopy is to identify or quantify molecular species based upon those species' characteristic IR/UV-VIS/NMR signatures. For example, spectroscopy is used to measure invisible gases in the atmosphere and the oxygenation of human blood. Another application is to use spectroscopy to gain information about a species' molecular vibrational/electronic/nuclear states, thus providing clues to the species' structure or properties. For example, spectroscopy is used to determine structural changes in chlorophyll upon exposure to sunlight. In still another application, spectroscopy is used to measure the interaction between atoms within a species or between atoms of two or more different species. For example, spectroscopy is used to measure the interaction between water molecules in ice.

Multidimensional spectroscopy, generally, correlates a one-dimensional spectrum to some other variable. The other variable might be time, phase of the light, or the presence of additional molecular excitations. Because the absorption spectrum evolves with time, etc., multidimensional spectroscopy can give unique clues to the structure or function of a species. Typically, multi-dimensional spectroscopy is limited to two or three additional variables because of the difficulty of visualizing and analyzing the resulting spectra. However, there is no theoretical limit to the number of dimensional variables that might be measured for a species in a given measurement.

Multidimensional NMR is the best developed form of multi-dimensional spectroscopy. Multidimensional NMR differs from one dimensional NMR in that more than one radio frequency pulse is applied to the sample, the additional pulses making possible the additional dimensional variables. Because of the ease of making radio pulse sequences, there are hundreds of different types of multidimensional NMR measurements that can be made. Multidimensional NMR has facilitated great progress in the fields of proteomics, helping scientists to understand the global structure of proteins in the solution phase. Multidimensional NMR has also provided insight into receptor binding and small molecule signaling by allowing scientists to measure distances between species once they have bound.

Multidimensional infrared, visible, and ultraviolet spectroscopy also holds great promise for the fields of proteomics, drug binding and small molecule signaling. In particular, multidimensional infrared spectroscopy can provide unique information about the structure of a protein and the protein's interaction with its environment. Ultraviolet-visible multidimensional spectroscopy can also provide unique information about the structure of a protein and the movement of charges about the protein. Additionally, in comparison to multidimensional NMR, multidimensional IR and UV-VIS spectroscopy offer better time resolution of dynamic structural changes, and smaller duty cycles for complex measurements.

SUMMARY OF THE INVENTION

In one embodiment, the invention provides a spectrometer capable of measuring multidimensional spectra of samples of interest. The spectrometer comprises a light source, a pulse shaper, a detector, and a processor.

The light source typically comprises a laser, the laser typically capable of producing tens of picoseconds or shorter pulses of coherent light, the wavelength of light suitably chosen from 200 to 20,000 nm. The light pulses produced by the source have a frequency profile, a temporal profile, a phase profile and a polarization profile, as do all light pulses. The pulses of light originating from the light source are typically split into a pump pulse and a probe pulse, although additional sources may provide additional pump or probe pulses.

A variety of pulse shapers are capable of modifying the frequency profile, the phase profile, the polarization profile, and the temporal profile of the pump pulse. The pulse shaper typically comprises two gratings, two focusing mirrors, two folding mirrors, and an active optical element such as an acousto-optic modulator (AOM), a selective light modulator (SLM), or a digital micromirror device (DMD). Suitably combined, these elements allow for a single pump pulse to be transformed into a train of light pulses with frequency, phase, and temporal profiles desirable for multidimensional spectroscopy. When desired, additional polarization separation components can be added to the pulse shapers to allow independent control of the polarization profile of the pump pulse.

The pump and probe pulses are typically directed to contact a sample of interest, whereupon the sample of interest emits electromagnetic fields after interacting with the pulses. As is known in the art of multidimensional spectroscopy, it is beneficial to observe the emitted electromagnetic fields produced by non-linear processes acting on the sample of interest. However, the sample of interest also emits electromagnetic fields as a result of linear processes, and the emitted electromagnetic fields from linear processes can make it difficult to independently measure the non-linear processes. The invention described herein overcomes much of this difficulty by overlapping the pump and probe pulses in a (mostly collinear) pump-probe geometry whereby the pump pulses and the probe pulse are offset by a small angle.

Typically, the emitted electromagnetic field [resulting from non-linear processes] is absorbed by a detector capable of measuring the temporal profile, the polarization profile and the frequency profile of the emitted electromagnetic field. The emitted electromagnetic field can be measured by itself, or in combination with the probe pulse. The detector typically converts the frequency and temporal profile of the electromagnetic field into an electronic signal such that the signal can be recorded and analyzed. Detectors capable of making these measurements are known in the art, and may include InSb detectors, HgCdTe detectors, photodiodes, charge-coupled devices, and photomultiplier tubes, among others.

Typically, a processor records and analyzes the signal from the detector, to which it is operatively connected, in order to form a multi-dimensional spectrum. The processor typically comprises one or more microprocessors, random access memory (RAM) and read only memory (ROM). The processor is typically also operatively connected to the light source and the pulse shaper such that the processor receives information about the timing of the pump and probe pulses and the frequency, phase, polarization, and temporal profile of the pump pulse after the pump pulse has been modified by the pulse shaper.

In some cases, it may be beneficial to separately measure the frequency, phase, polarization, and temporal profile of the pump pulse after the pump pulse has been modified by the pulse shaper. In this case, a correlator (cross, auto, etc.) may be used to determine the frequency, phase, polarization, and/or temporal profile of the pump pulse. The methods of measuring the frequency, phase, polarization, and temporal profile of a pulse of light are known to those in the art.

The resultant multidimensional spectra produced by the processor may be an independent function of the frequency, phase, polarization, or temporal profile of the pump pulse. Alternatively, the multidimensional spectra may be an independent function of a delay between when the pump pulse contacts the sample of interest and when the probe pulse contacts the sample of interest, or between when the pump pulse contacts the sample of interest and when an additional pump pulse or an additional probe pulse contacts the sample of interest, wherein the additional pump pulse or additional probe pulse are provided by an additional light source.

The invention also provides a method for measuring multidimensional spectra of a sample of interest. The method comprises producing a pump pulse and a probe pulse of coherent light, both pulses typically less than tens of picoseconds in duration and both pulses having a frequency profile, a phase profile, a polarization profile, and a temporal profile. The pump pulse is then modified by a pulse shaper, such that the frequency, phase, polarization, and temporal profile of the pump pulse are desirable for contacting a sample of interest in order to produce a multidimensional spectrum. The resultant pump pulse and probe pulse are then arranged in a mostly collinear, pump-probe geometry with respect to the sample of interest.

When the sample of interest is contacted with the pump pulse and probe pulse, the sample emits electromagnetic fields. Each electromagnetic field has a frequency profile, a polarization profile, a phase profile and a temporal profile. Because of the pump-probe geometry, electromagnetic fields emitted as a result of non-linear interactions involving the probe pulse are emitted in the direction of the probe beam, and away from emitted electromagnetic fields that resulted from the pump pulse alone. This arrangement allows for easier detection of the resultant electromagnetic field as compared to an all-collinear arrangement, or a completely non-collinear arrangement, such as a boxcar geometry.

The electromagnetic field emitted by the sample of interest and resulting from non-linear interactions involving the probe pulse are then detected by a detector which typically is capable of measuring the frequency, polarization, and temporal profile of the emitted electromagnetic field. The detector correspondingly outputs a signal indicative of the frequency and temporal profile of the emitted electromagnetic field.

The signal outputted by the detector is then processed to produce a multidimensional spectrum. Such a multidimensional spectrum may have two or more independent dimensions, such as frequency vs. time delay vs. intensity. A variety of multidimensional spectra may be created by correlating the frequency, phase, polarization, and/or temporal profiles of the emitted electromagnetic field with the frequency, phase, polarization, and/or temporal profile of the pump pulse.

The invention also provides for a device capable of shaping the frequency, phase, polarization, and temporal profile of infrared light from about 2,000 nm to about 20,000 nm (5000-500 $cm^{-1}$). The device comprises a germanium acousto-optic modulator (AOM), an AOM driver, polarization optics, frequency separation components and focusing optics.

Other aspects of the invention will become apparent by consideration of the detailed description and accompanying drawings.

DETAILED DESCRIPTION OF THE INVENTION

Figure 1:
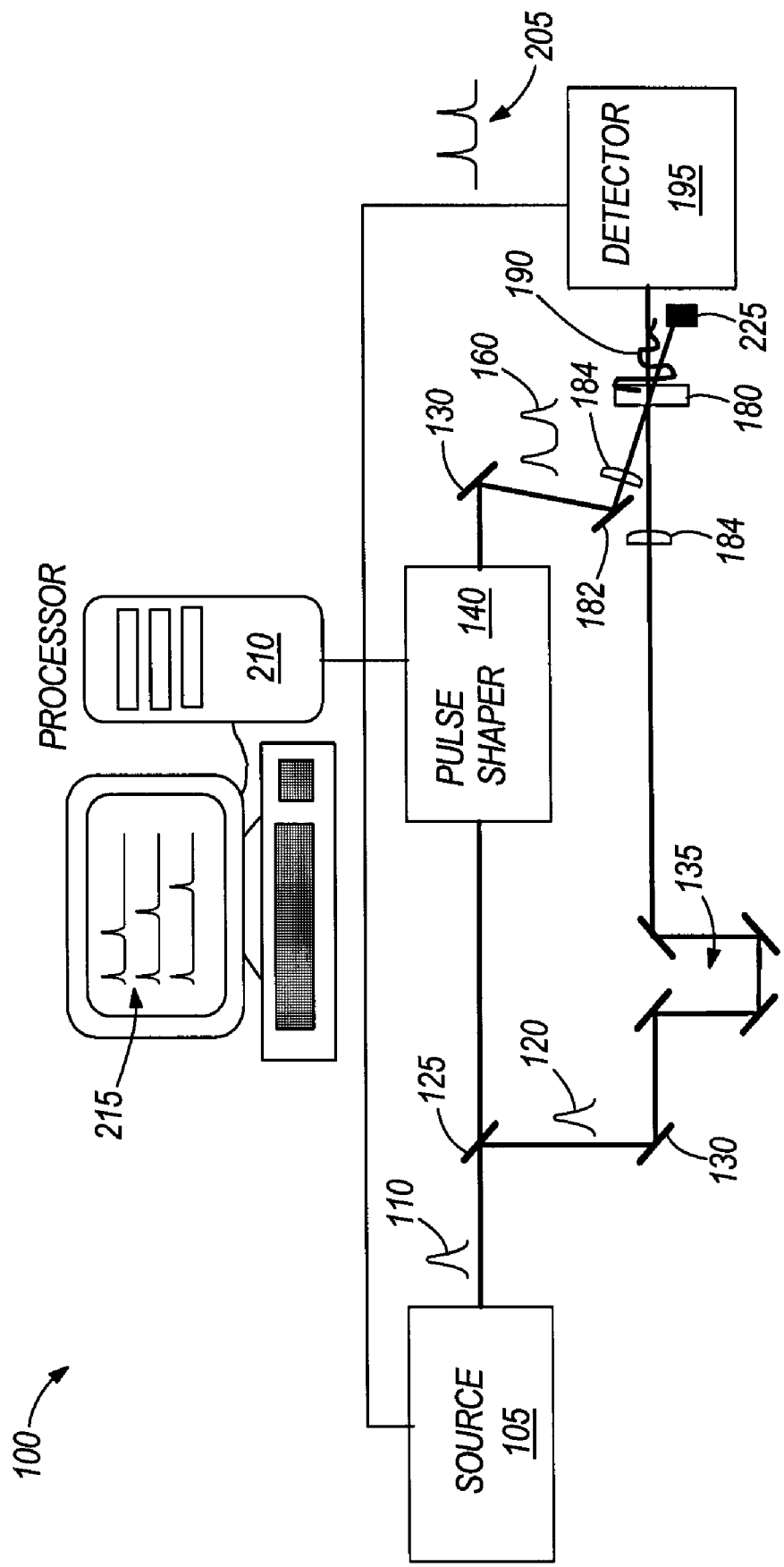
FIG. 1 is a diagram of one embodiment of a spectrometer according to the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Further, no admission is made that any reference, including any patent or patent document, cited in this specification constitutes prior art. In particular, it will be understood that, unless otherwise stated, reference to any document herein does not constitute an admission that any of these documents form part of the common general knowledge in the art in the United States or in any other country. Any discussion of the references states what their authors assert, and the applicant reserves the right to challenge the accuracy and pertinency of any of the documents cited herein.

The word "light" as used herein refers to electromagnetic radiation with wavelengths from 190 nm to 20,000 nm, spanning the range from the far-infrared region to the edge of the vacuum ultraviolet region. The following abbreviations may be used, as appropriate, for the given range of wavelengths: ultraviolet (UV) 190-390 nm; visible (VIS) 390-800 nm; infrared (IR) 800-20,000 nm; near infrared (near-IR) 800-3,000 nm; middle infrared (mid-IR) 3,000-6,000 nm; far infrared (far-IR) 6,000-20,000 nm.

As is well known in the art, a given wavelength of light corresponds to a given frequency of light. Thus "wavelength range," "wavelength profile," "frequency range," and "frequency profile" may be used interchangeably. A pulse of light has a frequency profile, describing the range of frequencies present in the pulse of light and the relative amounts of those frequencies. For example a pulse may contain an equal distribution of a set range of frequencies (e.g. a top-hat function), a varying distribution of frequencies (e.g. a Gaussian or Lorentzian function), or the frequency distribution may vary with propagation of the pulse (e.g. a chirp function).

The light used in the invention is typically coherent, that is, for a given pulse of light the rays of light have matched phases. A given pulse of light has a phase profile describing the change of the phase of the pulse of light with time. In multidimensional spectroscopic measurements, it is desirable that the relative pulse phases do not change, or only change in a known way, during the course of spectroscopic measurements (e.g., no "phase drift"). One benefit of the invention described herein is that the individual sub pulses of the pump pulse profile are automatically phase locked after leaving the pulse shaper.

The phase of the pulses need not remain static during the course of an experiment, however. In one embodiment, the phase of the pump pulse profile may be changed on a shot-to-shot basis in order to increase the signal to noise ratio. (See Shim et al., 104 *Proc. Natl. Acad. Sci*., (2007) 14197-202, incorporated herein by reference)

The pulses used in the invention are typically on the order of tens of picoseconds wide or narrower, with pulse widths on the order of hundreds of femtoseconds or narrower being more preferred, and pulse widths on the order of tens of femtoseconds being further preferred. Such pulse widths are typically obtained with mode-locked oscillators such as those employing Ti:sapphire crystals as a pump medium, however many other techniques, including optical parametric amplification, are known. Alternatively the pulse may originate from a mode-locked dye-laser. The temporal width of a pulse of light is one aspect of the temporal profile of a given pulse. The temporal profile may additionally comprise sub-pulses ("a pulse train"), each sub-pulse having its own pulse width. In the case of a pulse train, the centers of the sub-pulses are typically separated by a delay time, the delay time typically denoted t, or T, or τ.

In addition to a frequency profile, a phase profile, and temporal profiles, a given pulse of light has a polarization profile. The polarization of a pulse of light describes the orientation of the electric field vector of the pulse of light as a function of time, i.e. Ê(t). The polarization may be random, as is typical from spontaneous emission, or it may be oriented in space, as is typical with stimulated emission. Furthermore, an oriented polarization may rotate in space as the pulse of light propagates, e.g. circularly polarized light. In some embodiments, it is desirable to have a known and constant orientation of the electric field (e.g. linear or circular). In other embodiments and it may be desirable to alter the polarization of the pulse of light during a measurement. Varying the polarization of a pulse of light during a measurement can, in some cases, increase signal-to-noise levels or provide additional structural information.

For the purposes of simplicity, pulses of light discussed herein are denoted $k_i$, where it is understood that the pulse of light has a frequency profile, a phase profile, a polarization profile and a temporal profile.

As used herein, "sample of interest" is intended to broadly cover any compound or structure that is desired to be studied, and in a form that allows multidimensional spectroscopic measurements to be made. The sample of interest must be sufficiently transparent that the pump pulse and probe pulse are able to pass through the sample, however some of the pump pulse and/or some of the probe pulse may be absorbed by the sample of interest. Such a sample may comprise a plasma, a gas, a liquid, a solid, or a mixture thereof. The sample of interest may be homogenous, such as a solute in a solution, or it may be heterogeneous, such as a biological membrane. Typically, the sample of interest will be held by a container, the container being transparent to the light being used in the spectroscopic measurements, or having windows transparent to the light being used in the spectroscopic measurements. Such containers are known commercially, and include cuvettes, flow cells, and absorption cells. Specialized containers may be employed where desired, and may provide more or less pressure on the sample than is provided by the ambient atmosphere. Specialized containers may also modify the temperature of the sample of interest, or provide supplemental magnetic or electric fields.

"Correlator" as used herein, describes a collection of known optical components, such as beamsplitters, detectors, mirrors, and crystals, which are used to make measurements of the frequency, phase, polarization, or temporal profile of the pump pulse, both with respect to itself or with respect to another pulse (e.g. the probe pulse). Cross-correlation typically refers to the measurement of the profile of one pulse with respect to another pulse, while auto-correlation typically refers to the measurement of the profile of one pulse with respect to itself. For example, a portion of the shaped pump pulse may be combined with a portion of the unshaped pump pulse, the combined pulse split equally by a beamsplitter, and the resultant split pulses directed to two detectors for balanced heterodyne detection (cross-correlation). Such cross-correlation experiments allow measurement of the temporal profile of the shaped pump pulse. Alternatively, a portion of the pump pulse may be split into differing optical paths and then recombined in a second harmonic generating crystal to determine its profile. Well-known techniques of auto- and cross-correlation, such as FROG, SPIDER, etc. are intended to be included in this definition.

FIG. 1 is a diagram of a multidimensional spectrometer 100 embodying the principles of the invention. Spectrometer 100 is comprised of a source of light 105, a pulse shaper 140, a sample of interest 180, a detector 195, and a processor 210.

Typically, source of light 105 produces a singular pulse of light 110 which is split into a pump pulse 115 and a probe pulse 120 by a beamsplitter 125. Pump pulse 115 is acted on by pulse shaper 140 to produce a pump pulse profile 160, which may have two or more sub-pulses 165 (shown in FIG. 2; denoted $k_1$ and $k_2$). Pulse shaper 140 may be one of a variety of pulse shapers, appropriate for the wavelengths of the measurement, as further described in FIGS. 3-5. Probe pulse 120 (denoted $k_3$ in FIG. 2) may be redirected by one or more folding mirrors 130 before encountering a delay line 135, comprising a set of mirrors, wherein one of more of the mirrors are position-adjustable. Delay line 135 allows the arrival time of probe pulse 120 at the sample of interest 180 to be varied by adjusting the path length between source of light 105 and sample of interest 180. Delays in the arrival time of probe pulse 120 may also be achieved by other components, such as wedged optics. Alternatively, the delay between probe pulse 120 and pump pulse profile 160 may be altered in a relative fashion by adjusting with pulse shaper 140 when pump pulse profile 160 contacts sample of interest 180.

Pump pulse profile 160 and probe pulse 120 are arranged in a pump-probe (partially collinear) geometry by directing pump pulse profile 160 to cross probe pulse 120 at sample of interest 180 using a folding mirror 182. Typically, both pump pulse profile 160 and probe pulse 120 are focused into sample of interest 180 with a lens 184. Alternatively, a curved mirror such as a parabolic mirror can be used to focus pump pulse profile 160 and/or probe pulse 120 into sample of interest 180. The pump-probe (partially collinear) geometry typically entails pump pulse profile 160 and probe pulse 120 offset by an angle 220, as shown FIG. 2. Typically, pump pulse profile 160 will contact sample of interest 180 prior to probe pulse 120 contacting sample of interest 180. After being contacted by pump pulse profile 160 and probe pulse 120, sample of interest 180 will emit an electromagnetic field 190 (denoted $k_s$ in FIG. 2), resulting from a non-linear interaction of the sample of interest with pump pulse profile 160 and probe pulse 120. Detector 195 may be used alone to detect emitted electromagnetic field 190, or electromagnetic field 190 may be detected in a heterodyne fashion using a local oscillator 200 (FIG. 2), which may comprise a portion of probe pulse 120. Because of the pump-probe geometry, pump pulse profile 160 and emitted electromagnetic field 187, which may result from the linear interaction of sample of interest 180 with pump pulse profile 160, or from the non-linear interaction of sample of interest 180 with pump pulse profile 160, do not interact with detector 195, but are rather absorbed by a beamstop 225. Detector 195 outputs an electrical signal 205 (FIG. 1) indicative of properties of electromagnetic field 190, which is received by a processor 210 which produces a multidimensional spectrum 215 of the sample of interest 180 using electrical signal 205.

Figure 2A:
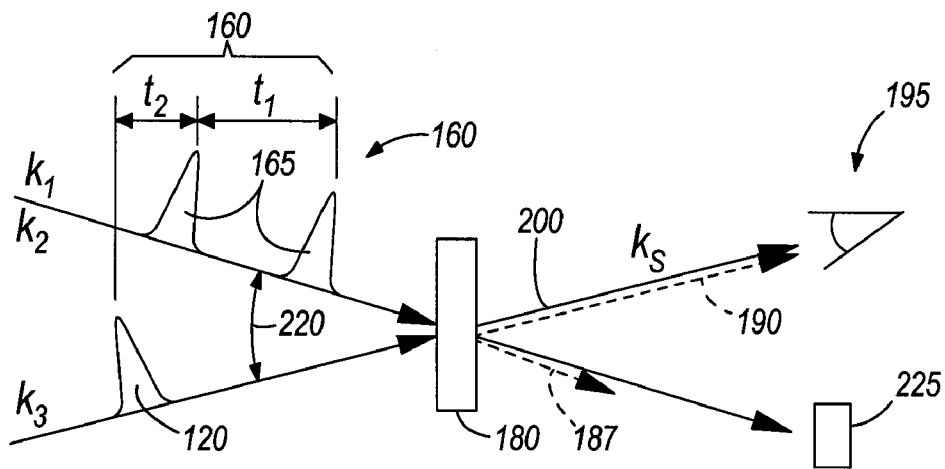
FIG. 2 is a diagram of three embodiments of the partially collinear pump-probe arrangements used in the invention.

FIG. 2A is a diagram of the pump-probe (partially collinear) geometry used to interrogate samples of interest 180. Pump pulse profile 160 comprising two or more sub-pulses 165, and probe pulse 120 are incident to sample of interest 180. While sub-pulses 165 contact sample of interest 180 collinearly, probe pulse 120 is offset at angle 220, such that sub-pulses 165 and probe pulse 120 intersect at sample of interest 180. Angle 220 is typically smaller than 25 degrees, and preferably smaller than 15 degrees, and more preferably smaller than 5 degrees. However, for certain measurements in which the polarization profile of pump pulse profile 160 is controlled, it may be beneficial for angle 220 to be greater than 25 degrees but smaller than or equal to 90 degrees.

Figure 2B:
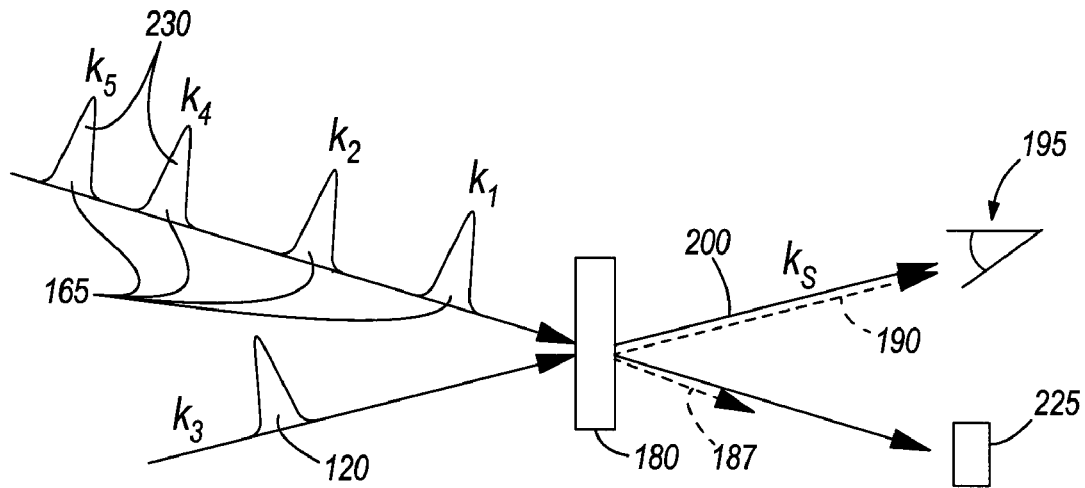
Figure 2C:
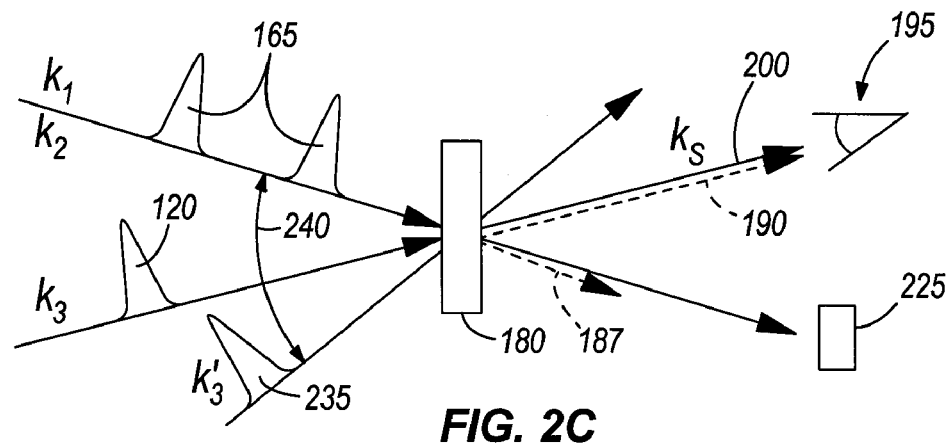

In some cases, as shown in FIG. 2B and FIG. 2C, it may be desirable to have additional sub-pulses 165 ($k_4$) formed by pulse shaper 140 from pump pulse 115 contact sample of interest 180. Alternatively, it may be desirable to have one or more additional pump pulses 230 ($k_5$), from an additional source, contact sample of interest 180. It may also be desirable to have one or more additional probe pulses 235 ($k_3'$) contact sample of interest 180. Typically all pump pulses 160/165/230 will contact sample of interest 180 collinearly, while probe pulse 120 and additional probe pulse 235 may be collinear, e.g. both offset at angle 220, or additional probe pulse 235 may be offset at an additional angle 240. Additional angle 240 is typically smaller than 45 degrees, and preferably smaller than 25 degrees and more preferably smaller than 10 degrees. For some polarization-control type measurements it may be beneficial to have pump pulse profile 160 and additional pump pulses 230 interact with sample of interest 180 in a non-collinear (e.g. perpendicular) fashion, however.

Figure 3:
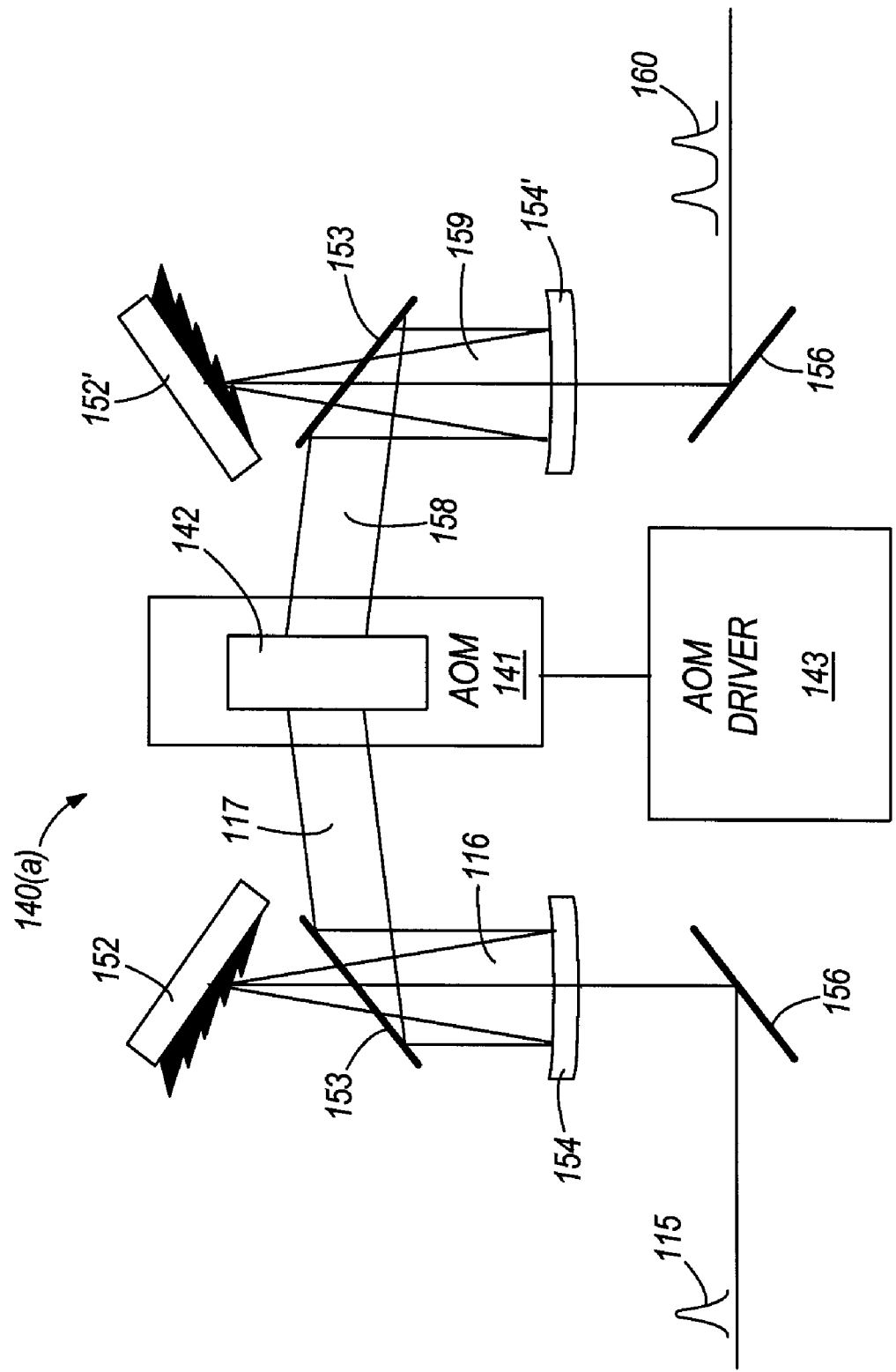
FIG. 3 is a diagram of one embodiment of an acousto-optic-modulator-based pulse shaper.
Figure 4:
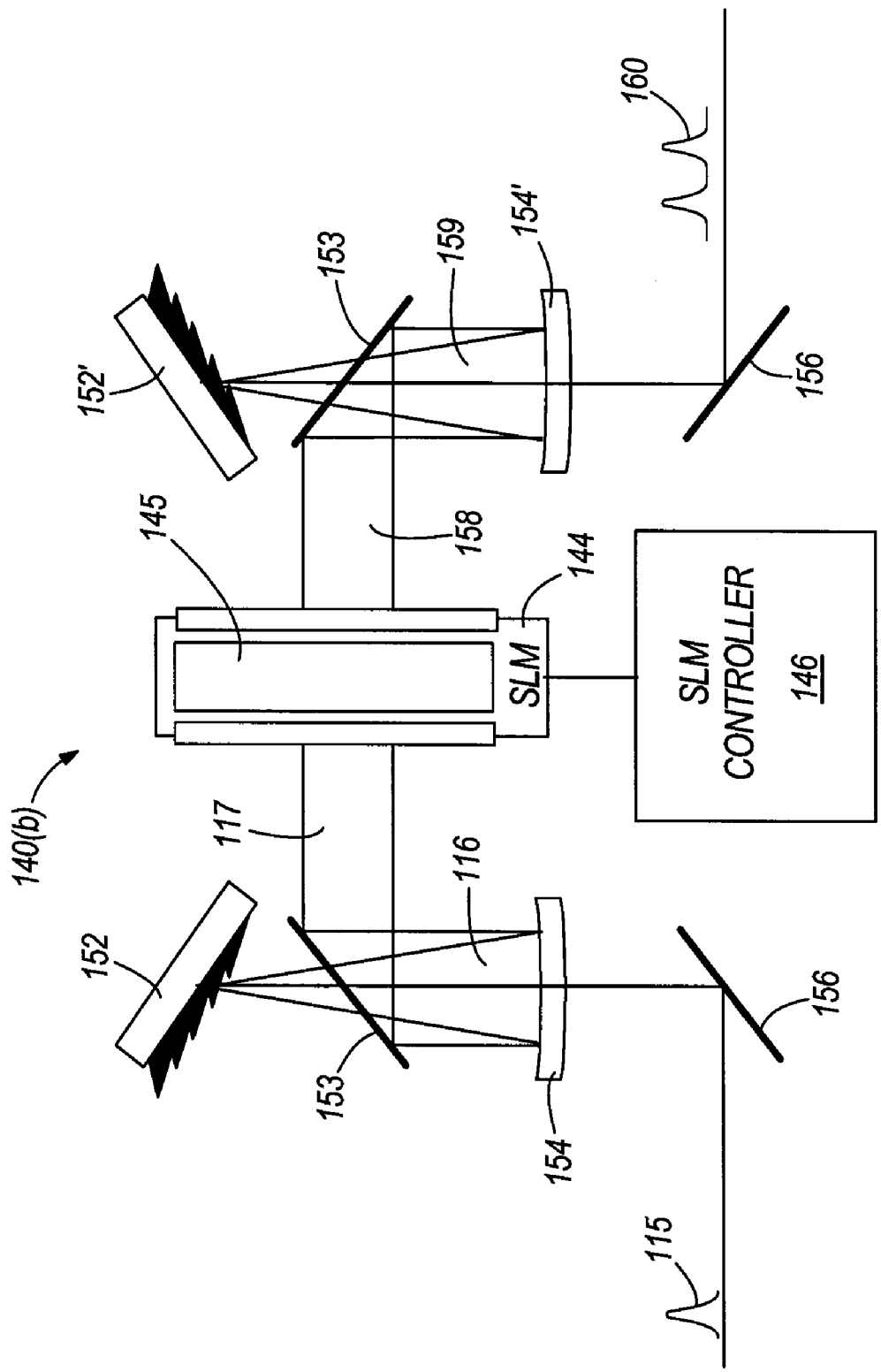
FIG. 4 is a diagram of one embodiment of a spatial-light-modulator-based pulse shaper.
Figure 5:
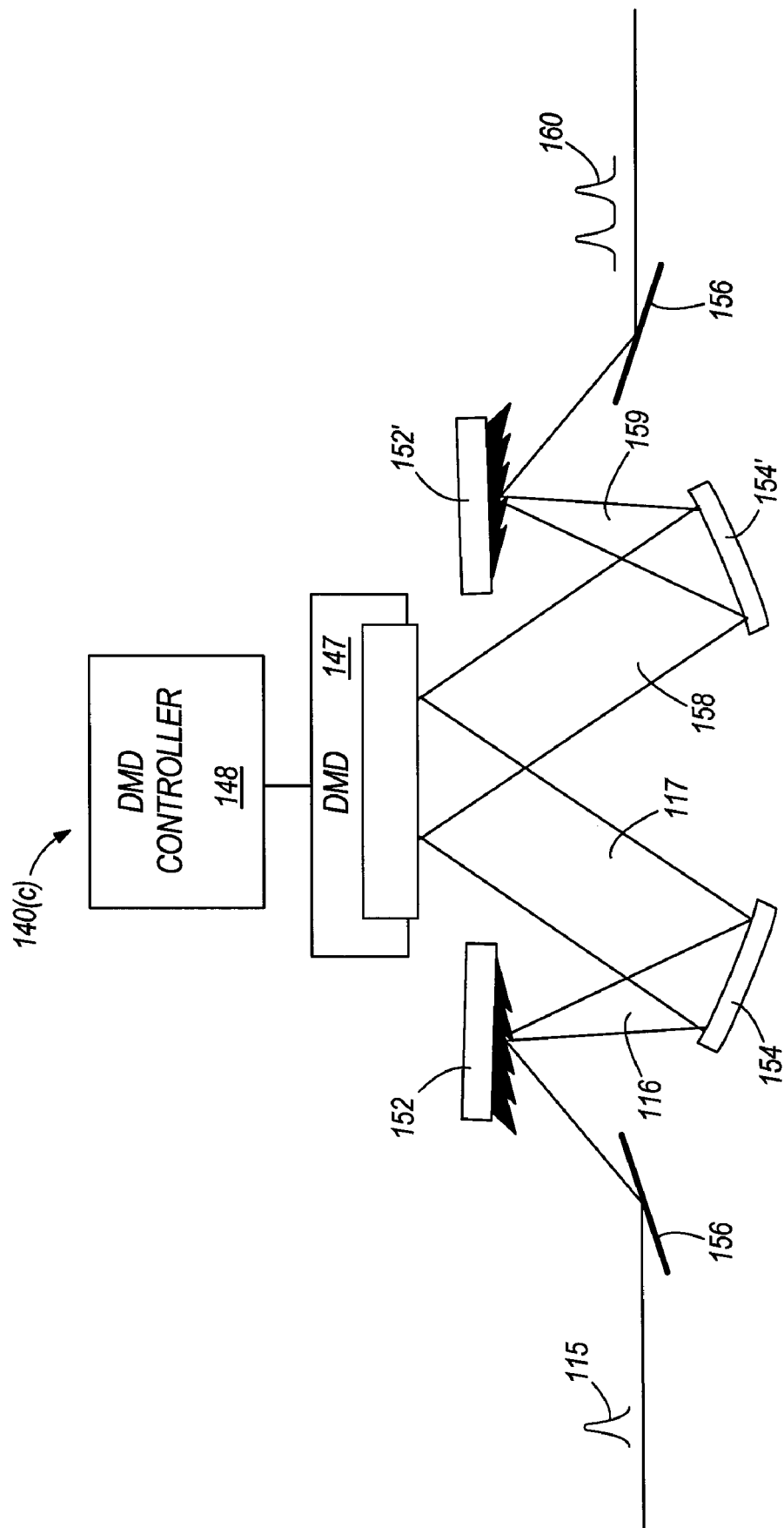
FIG. 5 is a diagram of one embodiment of a digital-micro-mirror-device-based pulse shaper.

The pulse shaper 140, shown in FIGS. 3-5 is capable of modifying the frequency profile, the phase profile, and the temporal profile of pump pulse 115. Pulse shapers, generally, are a known assembly of optical components. For example, FIG. 3 shows one variation of a pulse shaper 140(a), comprising an acousto-optic modulator (AOM) 141 containing a crystal 142, an AOM driver 143, frequency separation components 152, folding mirrors 153, and focusing optics 154 arranged in a 4-f geometry. The 4-f geometry is known to those of skill in the art.

For a properly chosen crystal 142 material and cut angle, the AOM-based pulse shaper 140(a) is capable of modifying the frequency, phase, or temporal profile of pump pulse 115 passing through crystal 142. AOM 141 typically uses a transducer to impart acoustic (compression) waves in crystal 142. AOM crystal 142 may be any of a number of crystals known in the art to have acousto-optic properties, provided crystal 142 has an appropriate transmission spectrum and acoustic response. In particular, germanium (Ge), tellurium oxide ($TeO_2$), and silicon dioxide ($SiO_2$/fused silica/crystalline quartz) crystals are useful for the invention described herein. Ge crystals are more useful for shaping infrared pulses, $TeO_2$ crystals more useful for shaping visible pulses, and $SiO_2$ crystals more useful for shaping visible and/or ultraviolet pulses. AOM driver 143 is typically an arbitrary waveform generator, however function generators may be used as well. Frequency separation components 152 are typically reflective gratings, however dispersive prisms could be used as well. Focusing optics 154 are typically cylindrical mirrors, used to collimate the beam after it has been dispersed by the frequency separation components, and then to refocus the beam after it leaves the AOM. Other focusing optics, such as lenses, could be used for this purpose. As necessary, folding mirrors 156 may be added to direct the pump pulse.

AOM-based pulse shaper 140(a) works by spatially dispersing the frequency components of the pump pulse 115 with frequency separation components 152 to create a dispersive, frequency-separated pump pulse 116, and then collimating the dispersive, frequency-separated pump pulse 116 with focusing optics 154 to create a collimated frequency-separated pump pulse 117. At this point, the frequency components of the collimated frequency-separated pump pulse 117 are separated in space. The collimated, frequency separate pump pulse is then directed to AOM crystal 142.

AOM crystal 142 is amplitude or frequency modulated by the transducer such that the index of refraction of a given portion of the crystal varies as a function of time. Because the light pulses of the invention are on the order of picoseconds or smaller, the index of refraction of a portion of the crystal medium is essentially static during the time that the light pulse passes through the crystal. In the absence of compression waves in crystal 142, collimated, frequency-separated pump pulse 117 would pass through crystal 142, refracted by some amount due to the "natural" index of refraction of crystal 142. By driving crystal 142 with a transducer, localized domains of index of refraction are created, thus creating a variable grating.

In the presence of acoustic waves in crystal 142, some frequency components of collimated frequency-separated pump pulse 117 are refracted away from the second frequency focusing optic 154'. The resulting shaped collimated frequency separated pump pulse 158 is then focused by focusing optic 154', resulting in a shaped frequency-separated pump pulse 159. Shaped frequency-separated pump pulse 159 then contacts frequency separation component 152', the shaped frequency-separated pump pulse 159 being transformed back into the time domain. The resultant pump pulse profile 160, has a different frequency and temporal profile. Because the transducer can be driven arbitrarily, pulse shaper 140(*a*) gives the ability to transform pump pulse 115 into pump pulse profile 160 as desired. Thus, AOM 141 with the appropriate crystal 142, allows the creation of pump pulse profiles 160 necessary to perform multidimensional spectroscopy in the infrared, visible, and ultraviolet regions of the electromagnetic spectrum.

It should be noted that pulse shaper 140(*a*) is typically aligned so that pulses 152 and 159 pass above or below folding mirror 153. FIG. 3 is not intended to imply that pulses 152 and 159 pass through folding mirror 153.

In another embodiment, the spectrometer may comprise a selective light modulator (SLM) 144 pulse shaper 140(*b*) such as the one shown in FIG. 4. SLM pulse shaper 140(*b*) has many of the same functional components as AOM pulse shaper 140(*a*), however the selective frequency rejection is done with an SLM 144, connected to an SLM controller 146. Instead of using compression waves in crystal 142, as is done with AOM pulse shaper 140(*a*), SLM 144 has individually-addressed liquid crystal pixels 145 that cause the absorption or transmission of light as desired. While SLM controller 146 may also be connected to an arbitrary waveform generator or function generator, SLM controller 146 may be capable of supplying its own waveforms, or SLM controller 146 may be controlled with a computer. In some embodiments SLM 144 and SLM controller 146 may be contained in the same device, such as the device sold by Holoeye Corp. Commercially-available SLMs 144 may have 640 individually addressed pixels, but pulse shaping may be achieved with far fewer pixels. Weiner describes several SLM arrangements for pulse shaping in a 2000 review paper (See 71 *Rev. Sci. Instruments*, 1929-60 (2000), incorporated herein by reference).

It should be noted that pulse shaper 140(*b*) is typically aligned so that pulses 152 and 159 pass above or below folding mirror 153. FIG. 4 is not intended to imply that pulses 152 and 159 pass through folding mirror 153.

In another embodiment, the spectrometer may comprise a digital micromirror device (DMD) 147 pulse shaper 140(*c*) such as the one shown in FIG. 5. DMD pulse shaper 140(*c*) has many of the same functional components as AOM pulse shaper 140(*a*) and SLM pulse shaper 140(*b*), however the selective frequency rejection is done with DMD 147, connected to a DMD controller 148. Unlike AOM 141 and SLM 144 which work by selectively transmitting desired frequencies of light, DMD 147 works by selectively reflecting desired components of collimated frequency separated pump pulse 117, such that they are recombined to form pump pulse profile 160. DMD 147 works on the same principle as DLP chips in televisions and projectors, containing an array of microfabricated mirrors that are individually controlled by DMD controller 148. DMD controller 148 allows control of the individual micromirrors, and is typically interfaced to a VGA controller of a computer. Pulse shaping with DMD 147 is possible for a large range of wavelengths because the only limitation is the ability to coat the microfabricated mirrors with a material suitably reflecting for the wavelengths of interest. The utility of a DMD for arbitrary pulse shaping of 800 nm femtosecond pulses is known. (See Belikov et al., *Proceedings of IEEE/LEOS International Conference on Optical MEMS* (August 2003), 24-25, incorporated herein by reference.)

Figure 6:
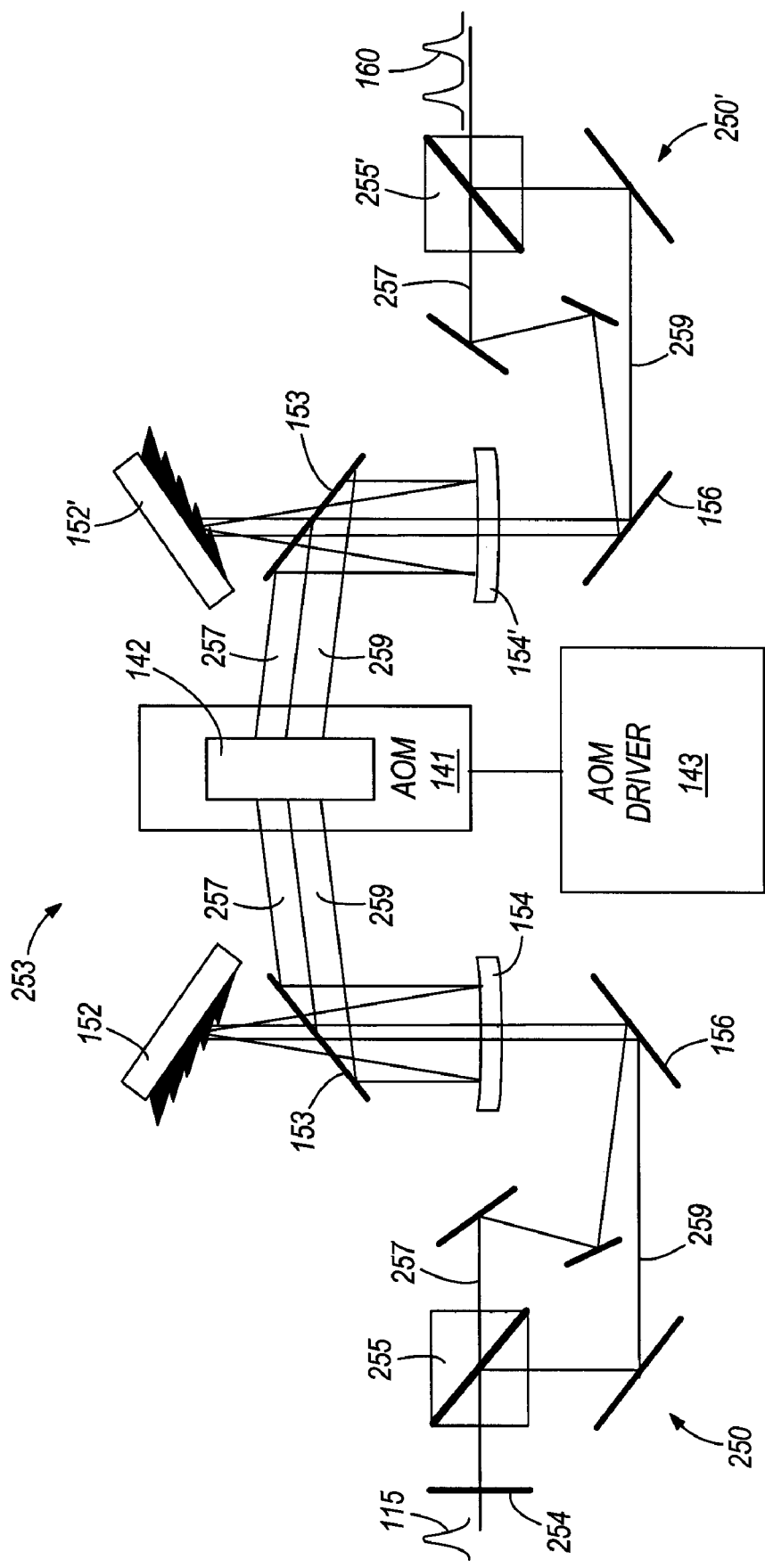
FIG. 6 is a diagram of one embodiment of an infrared polarization controller.

Regardless of the wavelength of light employed for the measurement, it is possible to make multi-dimensional spectroscopic measurements as a function of the frequency profile, the phase profile and the temporal profile of the pump pulse, as the pulse shapers 140 above have the ability to vary these profiles for each pump pulse. In the event that multidimensional polarization measurements are desired, pulse shapers 140 need additional polarization separation components 250 appropriate for the wavelengths used in the measurements, as shown in FIG. 6. Such polarization separation components may comprise a waveplate 254 and a polarization beam cube 255, suitably arranged so that orthogonal polarizations 257 and 259 are produced and separated. Provided the optical components are suitably aligned, separated polarizations 257 and 259 will arrive at different locations on crystal 142 of an AOM pulse shaper 140(*a*). In the same way that separated frequency components can be selectively removed from pump pulse 115 by pulse shaper 140, pulse shaper 140 with polarization separation components 250 can selectively remove polarization components of pump pulse 115. Alternatively, polarization separation components 250 may comprise a beam-splitter and one or more $\lambda/4$ waveplates.

FIG. 6 depicts polarization separation components 250, used in conjunction with an AOM pulse shaper 140(*a*), however polarization separation components may be suitably arranged for SLM pulse shapers 140(*b*) and DMD pulse shapers 140(*c*). Polarization separation components 250 may be combined with further polarization optics, as desired, to allow pump pulse profiles 160 with differing left- and right-circularly polarized light, for example.

The arrangement of components shown in FIG. 6, with crystal 142 comprising germanium, constitutes an infrared polarization controller 253. Infrared polarization controller 253 has not been previously disclosed. Such a polarization controller is not limited to pulses of picoseconds or less, and will allow the arbitrary control of the polarization of incident infrared beams. In particular, infrared polarization controller 253 provides the ability to the control the polarization profile of infrared light for a wide variety of experiments outside of multidimensional spectroscopy. For example such a polarization controller provides a means for controlling vibrational excitation in coherent control experiments.

Figure 7:
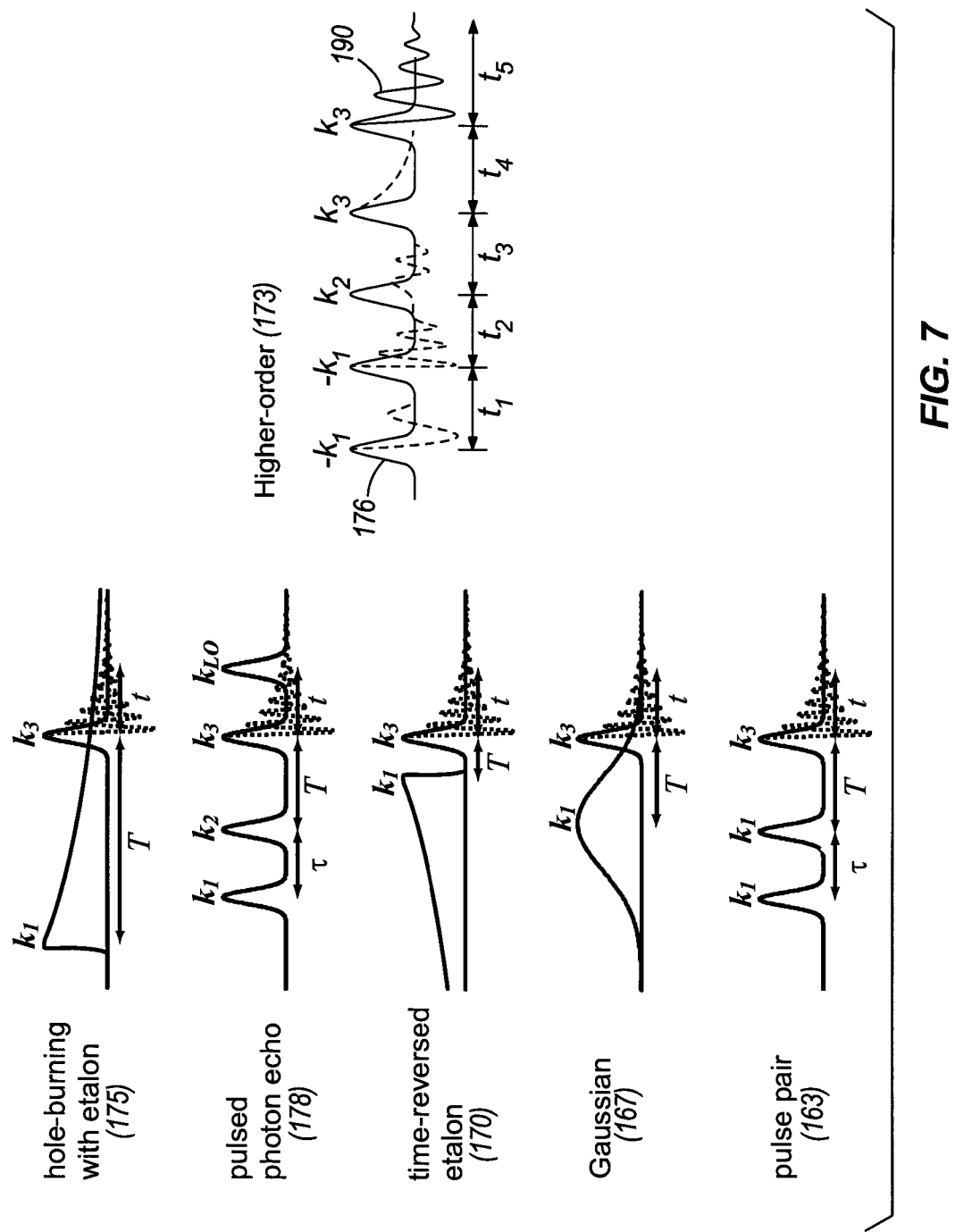
FIG. 7 shows six exemplary pulse sequences for use with the invention.

Given the ability to create pump pulse profile 160 as desired, it is possible to perform a myriad of two dimensional and higher spectroscopic measurements in the infrared, visible, and ultraviolet regions. Exemplary pulse sequences are shown in FIG. 7, although many other sequences have been described in the literature (see, e.g., Faeder and Jonas, 103 *J. Phys. Chem. A.*, 10489-505 (1999), incorporated herein by reference). In many cases, a multidimensional spectroscopic measurement will employ a pulse pair sequence 163, comprising $k_1$ and $k_2$ of pump pulse profile 160 in addition to $k_3$ of probe pulse 120. The resultant emitted electromagnetic field 190, shown as $k_s$, will be collected by detector 195 (FIG. 2A) and processed by processor 210 (FIG. 1) to create a multidimensional spectrum 215 (FIG. 1) such as the 2D spectrum of W(CO)$_6$ shown in FIG. 9. Alternatively, a Gaussian pump sequence 167, or a time-reversed etalon sequence 170 may be used. For three-dimensional or higher order measurements, it may be beneficial to use a higher-order pulse sequence 173, containing a series of pulses 176, k$_i$. All of these sequences are readily obtainable by using the invention described herein.

While it is possible to collect the multidimensional spectra as a function of frequency, time, phase, or polarization, it is known by those of the art that frequency and time measurements are easily interchanged through a Fourier transformation. In many cases, processor 210 will be programmed to produce multidimensional spectra as a function of frequency (as in FIG. 9) despite the data being collected by varying a delay between pump pulse profile 160 sub-pulses 165, or between sub-pulses 165 and probe pulse 120.

Figure 9:
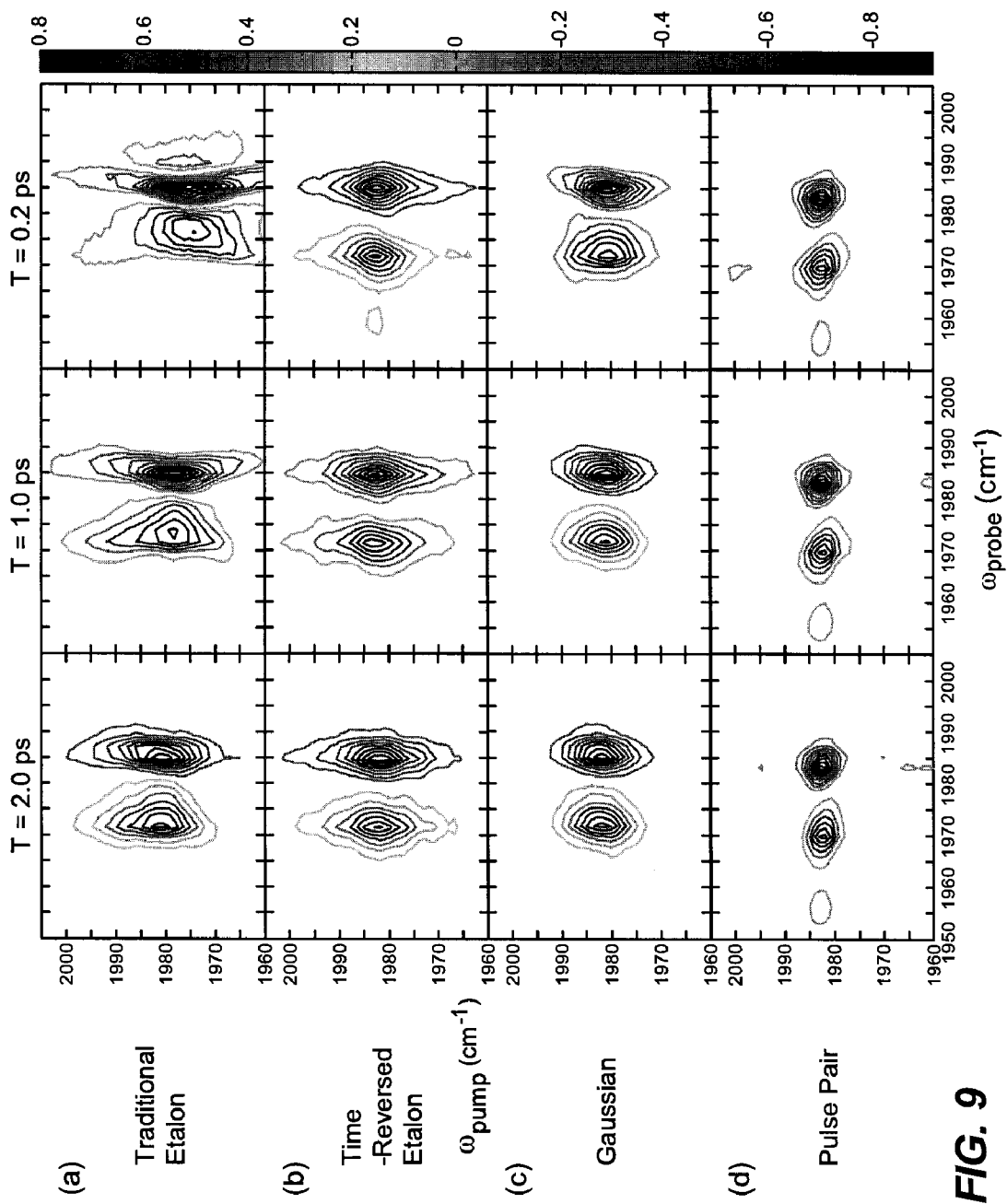
FIG. 9 shows an exemplary two dimensional infrared spectrum of $W(CO)_6$.

For example, electromagnetic field 190 is detected by detector 195 as a function of the delay between sub pulses 165 in pump pulse profile 160 (t$_1$ as shown in FIG. 2A). The measured signal can be written as $$S(t_1, t_2, \omega_{probe}) = \sum_n \left| (R_n(t_1, t_2, t_3) \otimes k_1 \otimes k_2 \otimes k_{probe} + k_{probe}) e^{-i\omega_{probe} t} dt \right|^2 \quad (1)$$

where k$_1$, k$_2$, and k$_3$ are understood to contain E$_1$, E$_2$ and E$_{probe}$, respectively, the three electric fields that interact with the oscillators; R$_n$(t$_1$, t$_2$, t$_3$) represents the n orientational, molecular, and coupling responses of the system; x̂ represent convolutions of the electric fields with R$_n$(t$_1$,t$_2$,t$_3$); and ω$_{probe}$ is the known frequency of probe pulse 120. The 2D spectrum is generated by Fourier transforming the signal along t$_1$ via $$S(\omega_{pump}, t_2, \omega_{probe}) = \int S(t_1, t_2, \omega_{probe}) e^{-i\omega_{pump} t_1} dt_1 \quad (2)$$

thus producing a 2D spectra of ω$_{pump}$ v. ω$_{probe}$ (see, e.g., FIG. 9).

The invention is further explained by the following examples, which should not be construed by way of limiting the scope of the invention.

Example 1

Two Dimensional Infrared Spectrum of W(CO)$_6$

Figure 8:
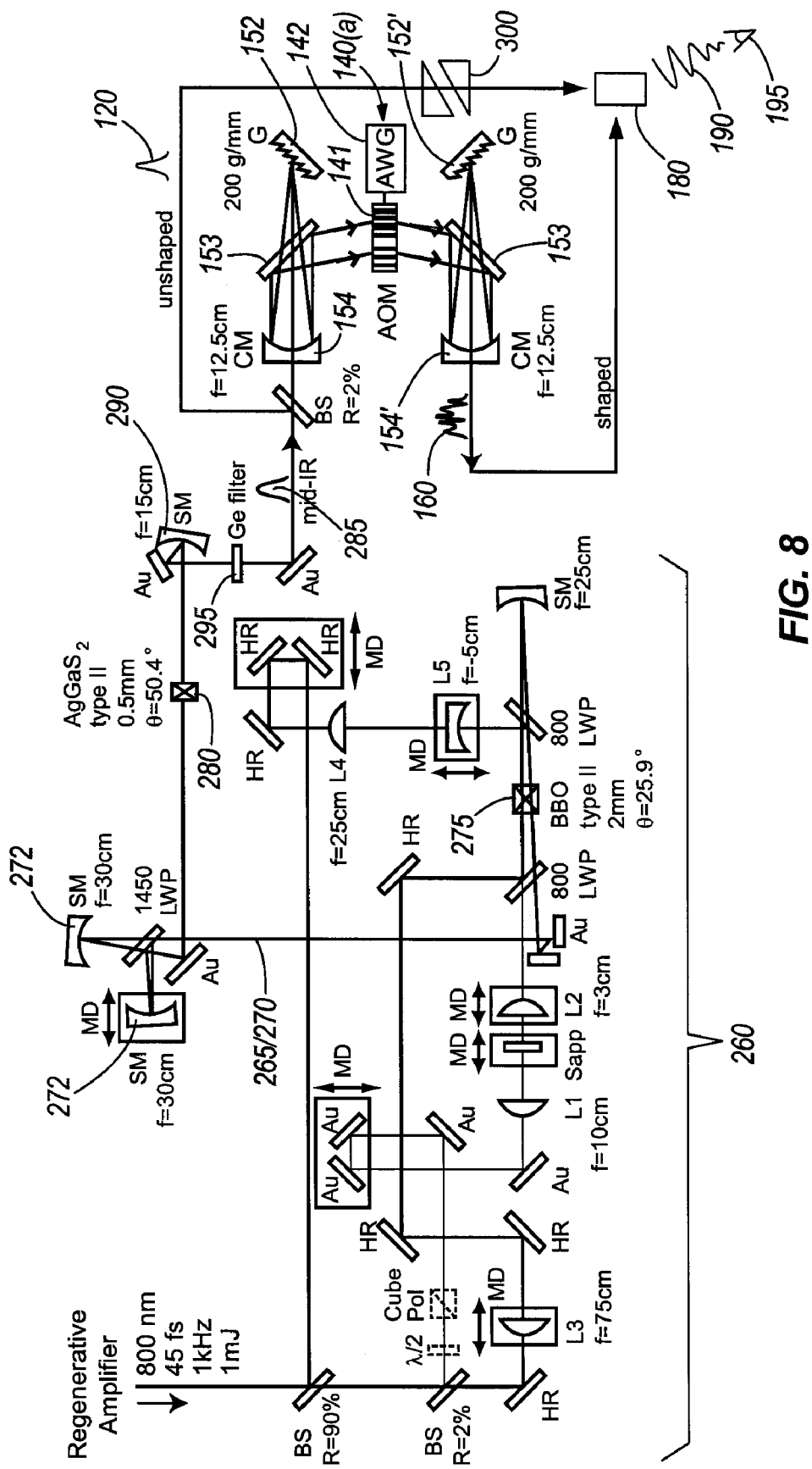
FIG. 8 is one embodiment of an optical setup used to make multidimensional vibrational spectroscopy measurements.

The layout of an optical parametric amplifier (OPA) 260 and germanium AOM pulse shaper 140(*a*) are shown in FIG. 8. The design and operation of OPA 260 is known to those of skill in the art (Kaindl et al., 17 *J. Opt. Soc. Am. B*, 2086 (2000), incorporated herein by reference). OPA 260 is pumped by 1 mJ, 45 fs transform limited pulses from a 1 kHz Ti:sapphire regenerative amplifier seeded by a home-built Ti:Sapphire oscillator (not shown in FIG. 8). Downconversion of the 800 nm into a signal pulse 265 and an idler pulse 270 (140 µJ) takes place in a type II BBO (θ=25.9°) crystal 275 in two stages with collinear alignment. Signal pulse 265 and idler pulse 270 are 2 mm in diameter before focusing with f=30 cm spherical mirrors 272. Mid-IR pulses 285 are generated by difference frequency mixing signal pulse 265 and idler pulse 270 in a type II AgGaS$_2$ crystal 280, cut at θ=50.4°. The generated mid-IR pulse 285 is collimated with a spherical gold mirror 290. The residual signal pulse 265 and idler pulse 270 are removed by a 1-mm-thick germanium filter 295, which is also used to overlap a collinear HeNe alignment beam on top of the mid-IR beam path. (The alignment beam makes it possible to visualize the complex arrangement of the invisible infrared pulses.)

Pulse shaper 140(*a*) is aligned in a 4-f geometry using diffraction gratings (200 grooves/mm) 152 and a pair of cylindrical mirrors (f=125 mm) 154. In this geometry, gratings 152, cylindrical mirrors 154, and AOM 141 are all separated by the focal length of cylindrical mirrors 154 with the germanium crystal 142 of AOM 141 placed at the Fourier plane. Because pulse shaper 140(*a*) incorporates gratings 152 placed in a quasi-Littrow configuration, and tilted in the vertical direction, pulse shaper 140(*a*) allows easy adaptability to multiple light sources such as a HeNe and the full spectrum of mid-IR.

Before inserting AOM 141, the 4-f geometry of the cylindrical mirrors 154 and gratings 152 is initially set using three parallel propagating HeNe beams diffracted from the first grating 152 with grating orders of 7, 8 and 9. AOM 141, when placed in the Fourier plane, deflects mid-IR pulse 285 at the Bragg angle of ~2° with amplitude and phase according to the acoustic wave passing through crystal 142. Since the HeNe beam does not transmit through germanium, it is necessary compensate for the ~2° angular deviation using beamsplitter 153 immediately before and after AOM 141. The deflection also adds a linear chirp to mid-IR pulse 285, which is compensated by translating the second grating 152' while maximizing the second harmonic signal (SHG) of the pump pulse profile 160 through a 0.5-mm thick doubling AgGaS$_2$ crystal (θ=33°) (not shown in FIG. 8).

Germanium AOM 141 was designed to operate at a 75 MHz center frequency and has a bandwidth of 50 MHz. A 300 Msample/s arbitrary waveform generator 143 is used to create an acoustic wave that propagates along the length of crystal 142 at 5.5 mm/µs. Given crystal 142's aperture of 5.5 cm×1 cm, the time aperture of AOM 141 is 10 µs. The frequency resolution of pulse shaper 140(*a*) is dictated by the product of the time aperture and the usable RF bandwidth from AOM driver 143, which is optimally 500, but is measured to be 190 under the current focusing conditions.

Since the acoustic wave appears static on the timescale of the mid-IR pulse 285 traversing crystal 142, the acoustic wave acts as a modulated grating, deflecting desired frequencies with amplitude and phase determined by the acoustic wave (as discussed above). As a result, the phase of pump pulse profile 160 is set by the phase of the acoustic wave. Thus, if pump pulse profiles 160 with reproducible phase are desired, it is imperative that AOM driver 143 is synchronized to the repetition rate of the laser. To accomplish this synchronization, a photodiode (not shown) monitors the repetition rate of the Ti:sapphire oscillator as a reference. A divider circuit (not shown) uses the resulting 88 MHz reference to generate a 1 kHz trigger pulse for both the arbitrary waveform generator and the amplifier YLF pump laser. A 300 MHz signal is also generated from the 88 MHz reference wave using a phase-locked loop circuit that serves as an external clock for the arbitrary waveform generator. This electronic configuration produces clock and trigger pulses synchronized to within 0.6 ns.

The resolution of pulse shaper 140(*a*) is characterized in the time-domain by auto- and cross-correlations of pump pulse profile 160. The auto- and cross-correlations utilize interferometers with 2 mm-thick ZnSe beam splitters and HgCdTe detectors (not shown in FIG. 8). The autocorrelator is constructed with a parabolic mirror and a 0.5 mm-long type I AgGaS$_2$ (θ=33°) doubling crystal to minimize additional dispersion. The cross-correlator overlaps the shaped beam collinearly with an unshaped beam split prior to the shaper and divides the recombined beam equally onto two HgCdTe detectors for balanced heterodyne detection. Techniques for auto- and cross-correlation are known to those of skill in the art, and have been discussed above.

Pump pulse profile 160, probe pulse 120, and sample of interest 160 are arranged in a partial-collinear pump/probe geometry as shown in FIG. 2A. For EXAMPLE 1, sample of interest 180 is $W(CO)_6$ dissolved in hexane. Time domain scans are taken with computer 210 controlled delay stages that translate one of two ZnSe wedged optics 300 ($\theta=5\pm0.2$ degrees), changing the amount of material that probe pulse 120 passes through. The time-resolution of this delay stage configuration is 0.02 fs. Over a 2 ps time-delay, the pulses broaden <0.16 fs due to the change in ZnSe thickness.

Pump pulse profile 160 was varied by pulse shaper 140(a) to provide pulse sequences 163, 165, 170, and 175, and data were collected as described above. A comparison of 2D lineshapes for the different sequences is shown in FIG. 9.

Example 2

Two Dimensional Visible Spectrum of Rb Vapor

Figure 10:
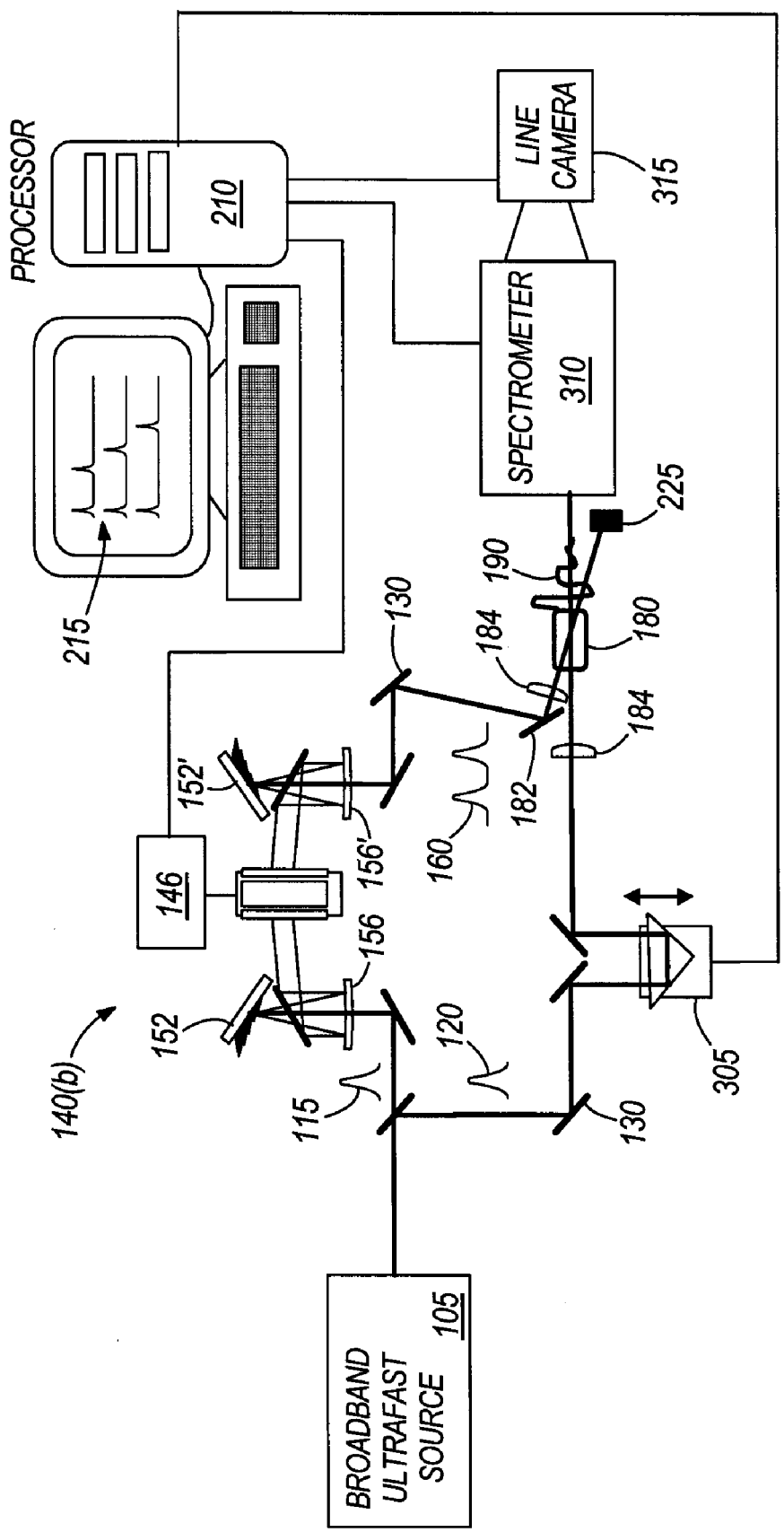
FIG. 10 is one embodiment of an optical setup used to make multidimensional electronic spectroscopy measurements.

The setup for measuring the two dimensional visible spectrum of Rb vapor is shown in FIG. 10. A broad-band ultrashort laser source 105 provides pump pulse 115 and probe pulse 120 with a center frequency of 800 nm, a frequency FWHM of 28 nm, a temporal FWHM of 50 fs, and a repetition rate of 1 KHz. The source has been described previously (See Montgomery et al., 110 *J. Phys. Chem. A,* 6391-6394 (2006), incorporated herein by reference). Pump pulse 120 was coupled into a home-built 4f zero-dispersion SLM pulse shaper 140(b). The SLM pulse shaper 140(b) comprises a pixilated dual-layer computer controlled SLM 144 placed at the Fourier plane of pulse shaper 140(b) and independently calibrated. SLM 144 has 640 individually addressable pixels 145, however only 130 are used to span the laser spectrum of pump pulse 120 as it is dispersed by grating 152. Phase and amplitude functions applied to SLM 144 via SML controller 146 produced variably spaced, collinear pump pulse profiles 160. Pump pulse profiles 160 had approximately 350 nJ/pulse. Probe pulse 120 traversed a computer-driven translation stage 305, which provided experimental control of the population time ($t_2$). Probe pulse 120 had approximately 15 nJ/pulse. Pump pulse profile 160 was focused with a 300 mm lens into a sealed Pyrex one-inch path length Rb gas cell 180 with ~20 mTorr of He buffer gas. Probe pulse 120 was focused with a 100 mm lens into Rb gas cell 180 at a small angle (~5°) with respect to pump pulse profile 160. The cell was heated to ~135±2° C. to increase the Rb vapor pressure.

Emitted electromagnetic field 190 propagated collinearly with probe beam 120 and was dispersed with a 1200 g/mm grating-commercial spectrometer 310. The dispersed signal was collected on a 1024 pixel photo diode line camera 315. A personal computer 210, synchronized with the source, was used to collect data from photo diode line camera 315 with programs written in-house using Labview. Multidimensional spectra 215 were collected with and without the pump pulse profile 160 and the change in absorption calculated ($\Delta A = A_{pump\ off} - A_{pump\ on}$). The 2D spectra are generated by Fourier transforming the data as a function of $t_1$, as explained above.

Figure 11:
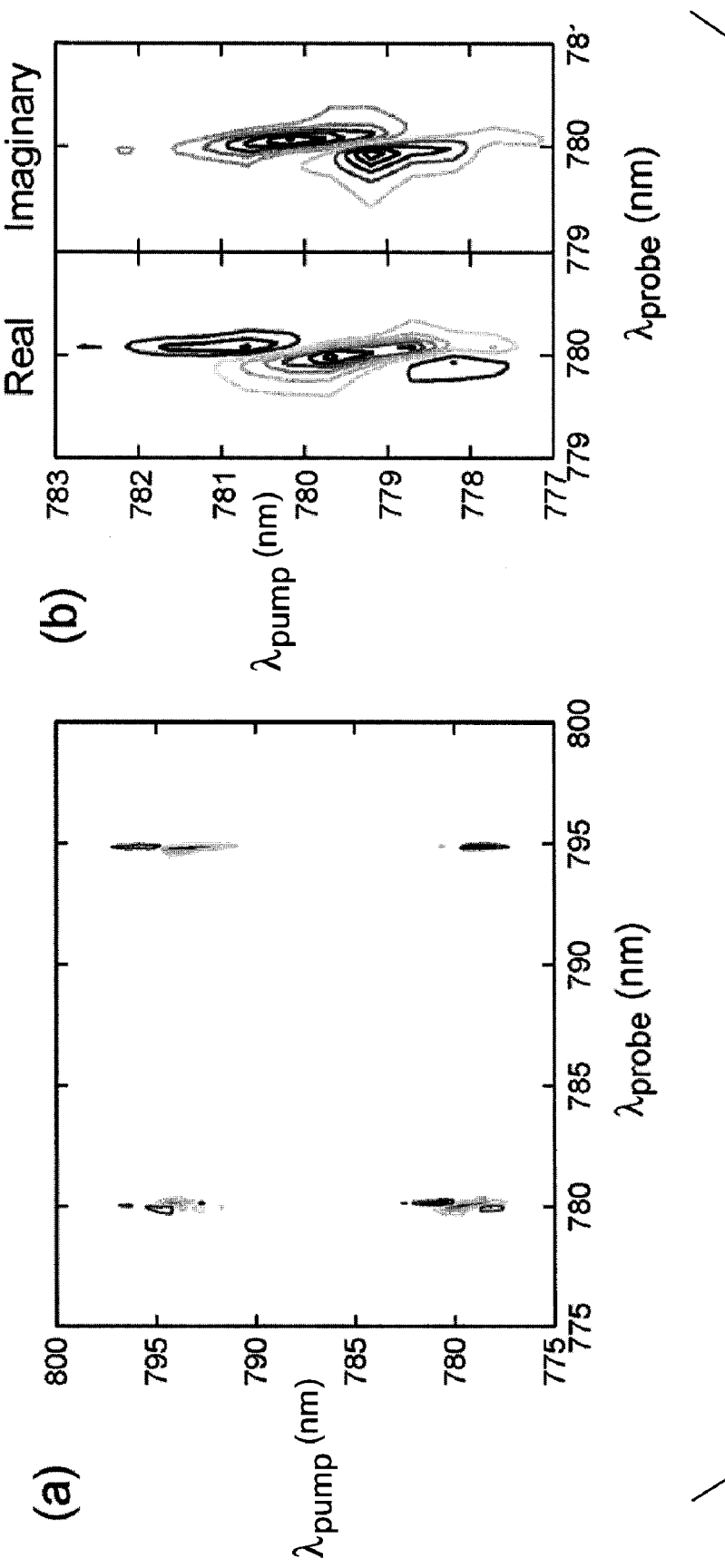
FIG. 11 shows an exemplary two dimensional visible spectrum of Rb vapor.

The resulting 2D spectra of Rb vapor are shown in FIG. 11.

In summary, the invention provides, among other things, a multidimensional spectrometer capable of making measurements which give clues to the structure and interactions of molecules and complexes. Spectrometers embodying the invention are useable over a wide range of wavelengths from the infrared to the ultraviolet. Additionally, the spectrometers provide means for producing complex pulse sequences that provide higher-order information about inter- and intra-molecular interactions. The invention also provides for a method of making multidimensional spectroscopic measurements. Additionally, the invention provides an infrared polarization controller comprising a germanium AOM that broadly allows control of the polarization of infrared light.

All publications, patents, and patent applications are herein expressly incorporated by reference to the same extent as if each individual publication, patent, or patent application was specifically and individually indicated by reference. In case of conflict between the present disclosure and the incorporated patents, publications and references, the present disclosure should control.

The invention has now been described with reference to various specific embodiments and techniques. However, it should be understood that many variations and modifications may be made while remaining within the spirit and scope of the invention. Various features and advantages of the invention are set forth in the following claims.

What is claimed is:

1. A spectrometer, comprising;
    a light source, the light source being able to produce a pump pulse of coherent light and a probe pulse of coherent light, the pump pulse and the probe pulse each having a frequency profile, a phase profile, a polarization profile and a temporal profile;
    a pulse shaper, the pulse shaper being able to modify the frequency profile, the phase profile and the temporal profile of the pump pulse;
    a sample of interest, wherein the pump pulse and the probe pulse contact the sample of interest, and wherein the sample of interest emits an electromagnetic field having a frequency profile, a polarization profile, a phase profile and a temporal profile after contacting with the pump pulse and the probe pulse;
    a delay line, the delay line being able to delay when the probe pulse contacts the sample of interest relative to when the pump pulse contacts the sample of interest;
    a detector, the detector being able to output a signal indicative of the frequency profile and the temporal profile of the electromagnetic field emitted by the sample of interest;
    a processor, operatively connected to the light source, the pulse shaper, and the detector, the processor being able to convert the signal from the detector into a multidimensional spectrum.

2. The spectrometer of claim 1, the pulse shaper being able to modify the polarization profile of the pump pulse.

3. The spectrometer of claim 1, further comprising a second light source, the second light source begin able to produce an additional pump pulse of coherent light or an additional probe pulse of coherent light or both an additional pump pulse of coherent light and an additional probe pulse of coherent light;
    the additional pump pulse and the additional probe pulse having a frequency profile, a phase profile, a polarization profile and a temporal profile; and
    wherein the additional pump pulse or the additional probe pulse or both the additional pump pulse and the additional probe pulse contact the sample of interest.

4. The spectrometer of claim 1, further comprising a correlator, the correlator being able to measure the temporal profile of the pump pulse.

5. The spectrometer of claim 1, wherein the pulse shaper comprises an acousto-optic modulator (AOM), an AOM driver, frequency separation components and focusing optics;
wherein the AOM, AOM driver, frequency separation components and focusing optics are operatively connected to each other to enable the pulse shaper to modify the frequency profile, the phase profile and the temporal profile of the pump pulse.

6. The spectrometer of claim 2, wherein the pulse shaper comprises an acousto-optic modulator (AOM), an AOM driver, frequency separation components, polarization separation components and focusing optics;
wherein the AOM, AOM driver, frequency separation components, polarization separation components and focusing optics are operatively connected to each other to enable the pulse shaper to modify the frequency profile, the phase profile, the polarization profile and the temporal profile of the pump pulse.

7. The spectrometer of claim 5 or 6, wherein the acousto-optic modulator comprises a germanium crystal.

8. The spectrometer of claim 5 or 6, wherein the acousto-optic modulator comprises a $TeO_2$ crystal.

9. The spectrometer of claim 5 or 6, wherein the acousto-optic modulator comprises a $SiO_2$ crystal.

10. The spectrometer of claim 1, wherein the pulse shaper comprises a spatial light modulator (SLM), an SLM controller, frequency separation components and focusing optics;
wherein the SLM, SLM controller, frequency separation components and focusing optics are operatively connected to each other to enable the pulse shaper to modify the frequency profile, the phase profile, and the temporal profile of the pump pulse.

11. The spectrometer of claim 2, wherein the pulse shaper comprises a spatial light modulator (SLM), an SLM controller, frequency separation components, polarization separation components and focusing optics;
wherein the SLM, SLM controller, frequency separation components, polarization separation components and focusing optics are operatively connected to each other to enable the pulse shaper to modify the frequency profile, the phase profile, the polarization profile and the temporal profile of the pump pulse.

12. The spectrometer of claim 1, wherein the pulse shaper comprises a digital micromirror device (DMD), a DMD controller, frequency separation components and focusing optics;
wherein the DMD, DMD controller, frequency separation components and focusing optics are operatively connected to each other to enable the pulse shaper to modify the frequency profile, the phase profile and the temporal profile of the pump pulse.

13. The spectrometer of claim 2, wherein the pulse shaper comprises a digital micromirror device (DMD), a DMD controller, frequency separation components, polarization separation components and focusing optics;
wherein the DMD, DMD controller, frequency separation components, focusing optics, and polarization separation components are operatively connected to each other to enable the pulse shaper to modify the frequency profile, the phase profile, the polarization profile and the temporal profile of the pump pulse.

14. The spectrometer of claim 1, wherein the processor is able to create a multidimensional spectrum as a function of the temporal profile of the pump pulse.

15. The spectrometer of claim 1, wherein the processor is able to create a multidimensional spectrum as a function of when the probe pulse contacts the sample of interest relative to when the pump pulse contacts the sample of interest.

16. The spectrometer of claim 1, wherein the processor is able to create a multidimensional spectrum as a function of the frequency profile of the pump pulse.

17. The spectrometer of claim 1, wherein the processor is able to create a multidimensional spectrum as a function of the phase profile of the pump pulse.

18. The spectrometer of claim 2, wherein the processor is able to create a multidimensional spectrum as a function of the polarization profile of the pump pulse.

19. The spectrometer of claim 3, wherein the processor is able to create a multidimensional spectrum as a function of when the pump pulse contacts the sample of interest relative to when the additional pump pulse or when the additional probe pulse or when both the additional pump pulse and the additional probe pulse contact the sample of interest.

20. A method of producing a multidimensional spectrum, comprising;
producing a pump pulse of coherent light and a probe pulse of coherent light, the pump pulse and the probe pulse each having a frequency profile, a phase profile, a polarization profile, and a temporal profile;
modifying the frequency profile and the temporal profile of the pump pulse with a pulse shaper;
delaying when the probe pulse contacts the sample of interest relative to when the pump pulse contacts the sample of interest;
arranging the pump pulse, the probe pulse and a sample of interest in a pump-probe geometry;
contacting the sample of interest with the pump pulse and the probe pulse, the sample of interest emitting an electromagnetic field having a frequency profile, a phase profile, a polarization profile and a temporal profile after contacting with the pump pulse and the probe pulse;
detecting the frequency profile and the temporal profile of the electromagnetic field emitted from the sample of interest with a detector;
outputting a signal from the detector that is indicative of the frequency profile and the temporal profile of the electromagnetic field emitted from the sample of interest; and
processing the signal from the detector with a processor to produce a multidimensional spectrum.

21. The method of claim 20, further comprising modifying the phase profile of the pump pulse.

22. The method of claim 20, further comprising modifying the polarization profile of the pump pulse.

23. The method of claim 20, further comprising contacting the sample of interest with an additional pump pulse or an additional probe pulse or both an additional pump pulse and an additional probe pulse, the additional pump pulse and the additional probe pulse having a frequency profile, a phase profile, a polarization profile and a temporal profile.

24. The method of claim 20, further comprising measuring the temporal profile of the pump pulse with a correlator.

25. The method of claim 20, further comprising modifying the frequency profile and the temporal profile of the pump pulse with a pulse shaper comprising an acousto-optic modulator (AOM), an AOM driver, frequency separation components and focusing optics;
wherein the AOM, AOM driver, frequency separation components and focusing optics are operatively connected to each other to enable the pulse shaper to modify the frequency profile, the phase profile and the temporal profile of the pump pulse.

26. The method of claim 21, further comprising modifying the phase profile of the pump pulse with a pulse shaper comprising an acousto-optic modulator (AOM), an AOM driver, frequency separation components and focusing optics;

wherein the AOM, AOM driver, frequency separation components and focusing optics are operatively connected to each other to enable the pulse shaper to modify the frequency profile, the phase profile and the temporal profile of the pump pulse.

27. The method of claim 22, further comprising modifying the polarization profile of the pump pulse with a pulse shaper comprising an acousto-optic modulator (AOM), an AOM driver, frequency separation components, polarization separation components and focusing optics;

wherein the AOM, AOM driver, frequency separation components, polarization separation components and focusing optics are operatively connected to each other to enable the pulse shaper to modify the frequency profile, the phase profile, the polarization profile and the temporal profile of the pump pulse.

28. The method of claim 25, 26 or 27, wherein the acousto-optic modulator comprises a germanium crystal.

29. The method of claim 25, 26 or 27, wherein the acousto-optic modulator comprises a $TeO_2$ crystal.

30. The method of claim 25, 26 or 27, wherein the acousto-optic modulator comprises a $SiO_2$ crystal.

31. The method of claim 20, further comprising modifying the frequency profile and the temporal profile of the pump pulse with a pulse shaper comprising a spatial light modulator (SLM), an SLM controller, frequency separation components and focusing optics;

wherein the SLM, SLM controller, frequency separation components and focusing optics are operatively connected to enable the pulse shaper to modify the frequency profile, the phase profile and the temporal profile of the pump pulse.

32. The method of claim 21, further comprising modifying the phase profile of the pump pulse with a pulse shaper comprising a spatial light modulator (SLM), an SLM controller, frequency separation components and focusing optics;

wherein the SLM, SLM controller, frequency separation components and focusing optics are operatively connected to enable the pulse shaper to modify the frequency profile, the phase profile and the temporal profile of the pump pulse.

33. The method of claim 22, further comprising modifying the polarization profile of the pump pulse with a pulse shaper comprising a spatial light modulator (SLM), an SLM controller, frequency separation components, polarization separation components and focusing optics;

wherein the SLM, SLM controller, frequency separation components, polarization separation components and focusing optics are operatively connected to enable the pulse shaper to modify the frequency profile, the phase profile, the polarization profile and the temporal profile of the pump pulse.

34. The method of claim 20, further comprising modifying the frequency profile and the temporal profile of the pump pulse with a pulse shaper comprising a digital micromirror device (DMD), a DMD controller, frequency separation components and focusing optics;

wherein the DMD, DMD controller, frequency separation components and focusing optics are operatively connected to each other to enable the pulse shaper to modify the frequency profile, the phase profile and the temporal profile of the pump pulse.

35. The method of claim 21, further comprising modifying the phase profile of the pump pulse with a pulse shaper comprising a digital micromirror device (DMD), a DMD controller, frequency separation components and focusing optics;

wherein the DMD, DMD controller, frequency separation components and focusing optics are operatively connected to each other to enable the pulse shaper to modify the frequency profile, the phase profile and the temporal profile of the pump pulse.

36. The method of claim 22, further comprising modifying the polarization profile of the pump pulse of coherent light with a pulse shaper comprising a digital micromirror device (DMD), a DMD controller, frequency separation components, polarization separation components and focusing optics;

wherein the DMD, DMD controller, frequency separation components, polarization separation components and focusing optics are operatively connected to each other to enable the pulse shaper to modify the frequency profile, the phase profile, the polarization profile and the temporal profile of the pump pulse.

37. The method of claim 20, further comprising processing the signal from the detector to produce a multidimensional spectrum as a function of the temporal profile of the pump pulse.

38. The method of claim 20, further comprising processing the signal from the detector to produce a multidimensional spectrum as a function of when the probe pulse contacts the sample of interest relative to when the pump pulse contacts the sample of interest.

39. The method of claim 20, further comprising processing the signal from the detector to produce a multidimensional spectrum as a function of the frequency profile of the pump pulse.

40. The method of claim 21, further comprising processing the signal from the detector to produce a multidimensional spectrum as a function of the phase profile of the pump pulse.

41. The method of claim 22, further comprising processing the signal from the detector to produce a multidimensional spectrum as a function of the polarization profile of the pump pulse.

42. The method of claim 23, further comprising processing the signal from the detector to produce a multidimensional spectrum as a function of when the pump pulse contacts the sample of interest relative to when the additional pump pulse or when the additional probe pulse or when both the additional pump pulse and the additional probe pulse contact the sample of interest.

* * * * *